(12) United States Patent
Ko

(10) Patent No.: US 6,430,314 B1
(45) Date of Patent: Aug. 6, 2002

(54) METHOD AND APPARATUS FOR ENTERING DATA STRINGS INCLUDING HANGUL (KOREAN) AND ASCII CHARACTERS

(75) Inventor: Soon Ko, San Diego, CA (US)

(73) Assignees: Sony Corporation, Tokyo (JP); Sony Electronics. Inc., Park Ridge, NJ (US)

( * ) Notice: Subject to any disclaimer, the term of this patent is extended or adjusted under 35 U.S.C. 154(b) by 0 days.

(21) Appl. No.: 09/234,429

(22) Filed: Jan. 20, 1999

(51) Int. Cl.[7] .......................... G06K 9/00; G06K 9/18; H03K 17/94; G09G 5/00; G06F 15/00

(52) U.S. Cl. ...................... 382/185; 382/181; 382/186; 382/187; 382/189; 382/229; 382/282; 382/309; 341/28; 345/171; 345/467; 707/535; 707/536; 707/540

(58) Field of Search ................................ 382/181, 185, 382/186, 187, 189, 180, 229, 282, 284, 309, 310; 345/141, 157, 168, 171, 467; 707/535–536, 540; 341/28

(56) References Cited

U.S. PATENT DOCUMENTS

| | | | | |
|---|---|---|---|---|
| 4,670,841 A | * | 6/1987 | Kostopoulos | 707/535 |
| 4,827,530 A | * | 5/1989 | Yamaguchi et al. | 382/185 |
| 4,937,745 A | * | 6/1990 | Carmon | 707/535 |
| 4,951,202 A | * | 8/1990 | Yan | 707/535 |
| 5,454,046 A | * | 9/1995 | Carman, II | 382/186 |
| 5,717,425 A | * | 2/1998 | Sasaki | 345/157 |
| 6,005,549 A | * | 12/1999 | Forest | 345/157 |
| 6,161,116 A | * | 12/2000 | Saltzman | 707/535 |
| 6,170,000 B1 | * | 1/2001 | Bories et al. | 707/535 |

FOREIGN PATENT DOCUMENTS

GB  2186163 A  *  8/1987  ............ G09G/1/14

OTHER PUBLICATIONS

Shin, et al "Implementation of Hangul Automation Processor Based on the Stroke", IEEE, pp. 348–351, 1996.*

* cited by examiner

Primary Examiner—Leo Boudreau
Assistant Examiner—Daniel G. Mariam
(74) Attorney, Agent, or Firm—Crosby, Heafey, Roach & May

(57) ABSTRACT

Described are methods for entering and editing data strings that are inputted into cellular telephones having a screen. In one method, all basic Hangul consonants and some of the compound Hangul consonants are included in a candidate consonant list and all basic Hangul vowels and some of the compound vowels are included in a candidate vowel list. The candidate consonant and vowel lists are alternatively displayed on a component display region (906) located on the screen. To form a Korean character, a user can select consonant(s) and vowel from the candidate consonant and vowel lists. To form a compound Hangul component that is not included in either the candidate consonant list or the candidate vowel list, the user selects a basic Hangul component as a first part of the compound Hangul component from either the candidate consonant list or the candidate vowel list. The user then re-displays the candidate consonant list or the candidate vowel list and selects a basic Hangul component as a second part of the compound Hangul component. A compound Hangul component is formed by combing the two selected basic Hangul components and displayed in a data string display region (904) located on the screen. In another method, a data string can be formed using both Hangul and ASCII characters. In yet another method, a data string can include unusual characters that are invalid to the existing cellular telephone. In still another method, editing can be made at any position of a data string that is inputted to the cellular telephones.

68 Claims, 13 Drawing Sheets

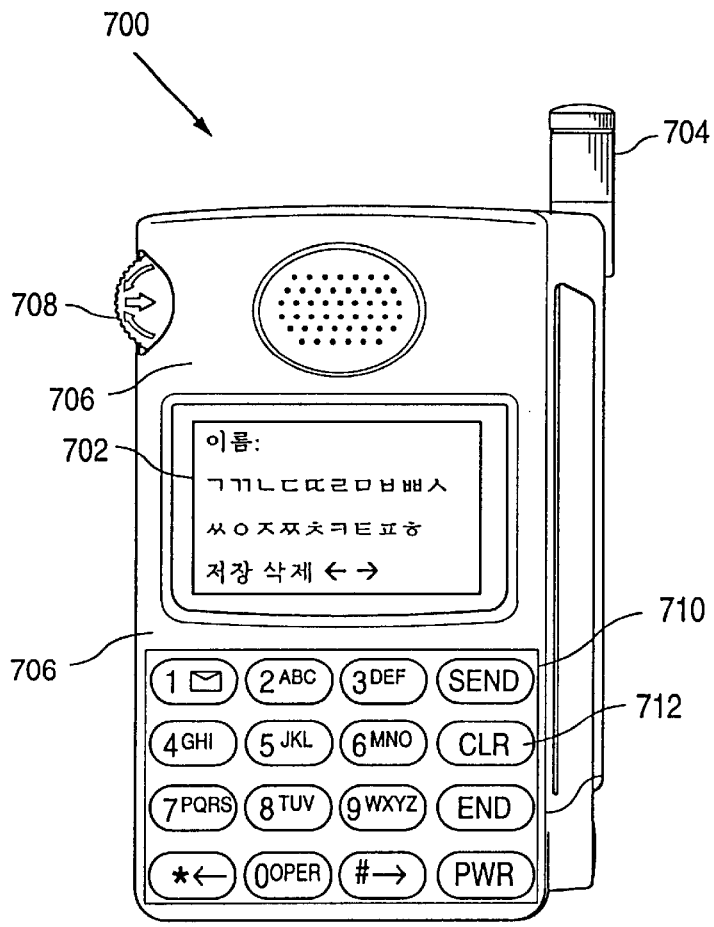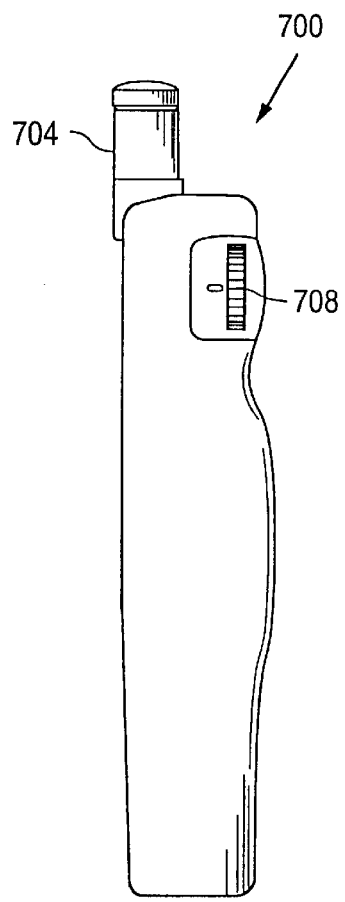
FIG. 7A  FIG. 7B

METHOD AND APPARATUS FOR ENTERING DATA STRINGS INCLUDING HANGUL (KOREAN) AND ASCII CHARACTERS

BACKGROUND OF THE INVENTION

1. Field of the Invention

This invention relates generally to a method and apparatus for entering data strings including Hangul (Korean) and/or ASCII characters into electronic devices and, more specifically, to a method and apparatus for forming data strings by selecting Hangul character components displayed on a relatively small display region and selecting ASCII characters from a key panel.

2. Related Art

To effectively market electronic devices such as cellular telephones and personal digital assistants (PDA) in the Korean market, the instruction and information displayed on these electronic devices should be primarily in the Korean language. The Korean written language uses two types of characters: Hangul and Hanja. Hangul is the native name for the Korean language, and Hanja is the Korean name for ideographic characters of Chinese origin. The Hanja characters are usually used in more formal written communications. Most daily communications are written in Hangul. Therefore, it is necessary to provide a mechanism to allow users to enter Hangul characters into electronic devices, because some information in the electronic devices need to be customized by individual users.

Hangul characters are composed of Hangul components which include thirty consonants and twenty one vowels. Conventionally, the whole set of Hangul consonants and vowels are assigned to the keys on a keyboard. For example, the thirty Hangul consonants and twenty one vowels can be assigned to a computer keyboard having no more than fifty keys when used with the SHIFT and ALT keys. However, the conventional method is not suitable for portable electronic devices which have few keys or do not have a keyboard at all. An external keyboard could be attached to these portable electronic devices. However, it is inconvenient to do so due to the small size of these portable electronic devices. Furthermore, portable electronic devices typically have a relatively small display region. This increases the difficulty of entering Hangul characters into the portable electronic devices.

The existing cellular telephones are not user friendly in entering data strings. Specifically, the existing cellular telephones are unable to enter a data string including both Hangul and ASCII characters. In addition, the existing cellular telephones are only able to accept valid, fully constructed Hangul characters. For example, the existing cellular telephones do not accept one Hangul consonant, two Hangul consonants, or two Hangul vowels as a valid Hangul input. Furthermore, the existing cellular telephones are unable to delete and insert a character in a middle position of a data string. To delete a character in a middle position of a data string, a user has to delete all trailing characters up to that character. Similarly, to insert a character in a middle position of a data string, a user has to delete all characters up to that position, enter the character needed to be inserted, and then re-enter all of the earlier erased characters. These shortcomings are inconvenient for users to enter data strings into cellular telephones.

There is, therefore, a need to provide an improved method and apparatus for entering Hangul characters into electronic devices that have few keys or do not have a key board.

There is another need to provide an improved method and apparatus for entering Hangul characters into electronic devices that have a relatively small display region.

There is also another need to provide an improved method and apparatus for entering a data string including both Hangul and ASCII characters.

There is yet another need to provide an improved method and apparatus for entering unusual Hangul component combinations.

There is still another need to provide an improved method and apparatus for deleting and inserting a character in the middle position of a data string.

The present invention provides the methods and apparatuses to meet these needs.

SUMMARY OF THE INVENTION

To overcome the shortcomings in the available art, the present invention provides novel methods for forming Hangul characters oh electronic devices.

In one aspect, the present invention provides a method for selecting Hangul components to form Hangul characters. The Hangul components include a plurality of first type basic components and a plurality of first type compound components. Each of the first type compound components is composed of two first type basic components. The Hangul components further include a plurality of second type basic components and a plurality of second type compound components. Each of the second type compound components is composed of two second type basic components. The method comprises the steps of: (a) forming a first list including all the first type basic components; (b) forming a second list including all the second type basic components; (c) displaying the first list on a first screen region located on a screen, and inputting a first Hangul component by selecting a first type basic component from the first list; (d) if the first Hangul component is a first type compound component, displaying the first list in the first display region, selecting a first type basic component from the first list, and forming the first Hangul component by combining the first type basic component selected in step (c) with the first type basic component selected in the step (d); and (e) displaying the second list on the first region to replace the first list, and inputting a second Hangul component by selecting a second type basic component.

In another aspect, the present invention provides a method for forming a Hangul character by selecting Hangul components from a consonant group and a vowel group. The consonant group contains a plurality of basic consonants and a plurality of compound consonants. Each of the compound consonants is composed of two of the basic consonants. The vowel group contains a plurality of basic vowels and a plurality of compound vowels. Each of the compound vowels is composed of two of the basic vowels. The method comprises the steps of: (a) forming a consonant list containing all the basic vowels and some of the compound consonants; (b) forming a vowel list containing all the basic vowels and some of the compound vowels; (c) displaying the consonant list on a first screen region located on a screen; (d) selecting a consonant from the consonant list displayed on the first screen region; (e) displaying the vowel list on the first screen region to replace the consonant list; (f) selecting a vowel from the vowel list displayed on the first screen region; and (g) forming a Hangul character by combining the selected consonant and vowel.

In also another aspect, the present invention provides a method for entering a data string including both Hangul and ASCII characters into an electronic device having a screen and key panel. The method comprises the steps of: displaying at least one Hangul list containing a plurality of Hangul components on a first display region located on the screen; inputting at least one Hangul character by selecting at least one Hangul component from the list displayed in the first region; inputting at least one ASCII character by selecting at least one ASCII character from the key panel; and forming the data string using the inputted Hangul character and the inputted ASCII character.

In yet another aspect, the present invention provides a method for entering a Hangul character into an electronic device having a screen. The method comprises the steps of: displaying a plurality of Hangul consonants; selecting one of the consonants; indicating a completion of the selection; and forming a Hangul character using the selected consonant.

In still another aspect, the present invention provides a method for entering a Hangul character into an electronic device having a screen. The method comprises the steps of: displaying a plurality of Hangul vowels; selecting one of the vowels; indicating a completion of the selection; and forming a Hangul character using the selected vowel.

The present invention also provides the apparatuses for performing the steps in the methods discussed above.

BRIEF DESCRIPTION OF THE DRAWINGS

The foregoing and other objectives, features and advantages of the invention will be more readily understood upon consideration of the following detailed description of certain preferred embodiments of the invention, taken in conjunction with the accompanying drawings.

FIG. 1 depicts fourteen basic Hangul consonants;

FIG. 2 depicts sixteen compound Hangul consonants;

FIG. 3 depicts ten basic Hangul vowels;

FIG. 4 depicts eleven compound Hangul vowels;

FIG. 5 depicts a candidate consonant list including the fourteen basic Hangul consonants and four of the sixteen compound Hangul consonants, in accordance with the present invention;

FIG. 6 depicts a candidate vowel list including the ten basic Hangul vowels and four of the eleven Hangul compound vowels, in accordance with the present invention;

FIG. 7A depicts the front view of a cellular telephone that has the capability of entering Hangul and ASCII characters, in accordance with the present invention;

FIG. 7B depicts the side view of the cellular shown in FIG. 7A;

DETAILED DESCRIPTION OF THE PREFERRED EMBODIMENT

Figure 8:
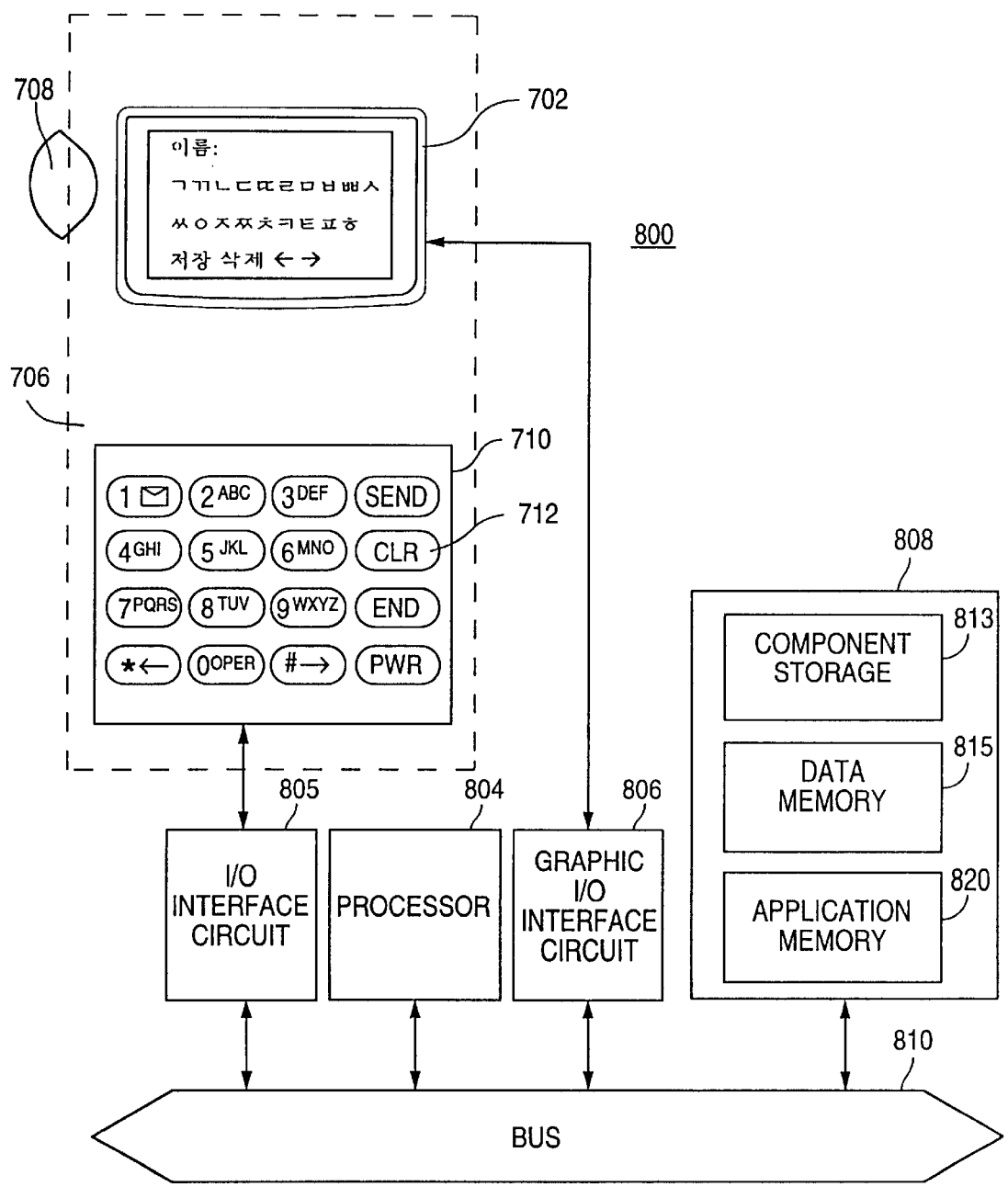
FIG. 8 depicts a block diagram, illustrating some components of the cellular telephone shown in FIG. 7A.
Figure 9A:
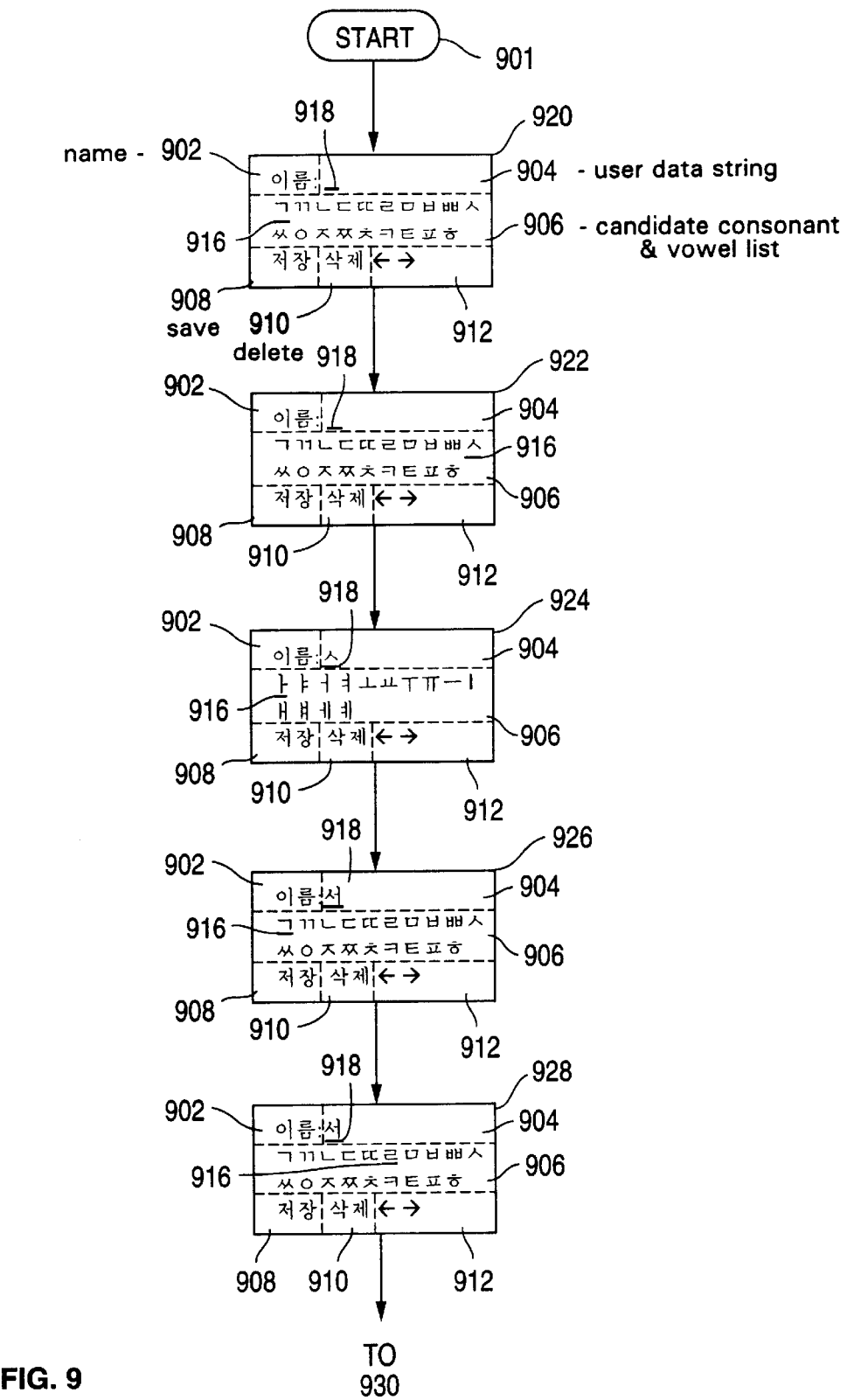
FIG. 9 depicts a sequence of screen shots, illustrating a process of selecting Hangul components, forming Hangul characters, and entering the formed Hangul characters into the cellular telephone shown in FIG. 7A, in accordance with the present invention.
Figure 9B:
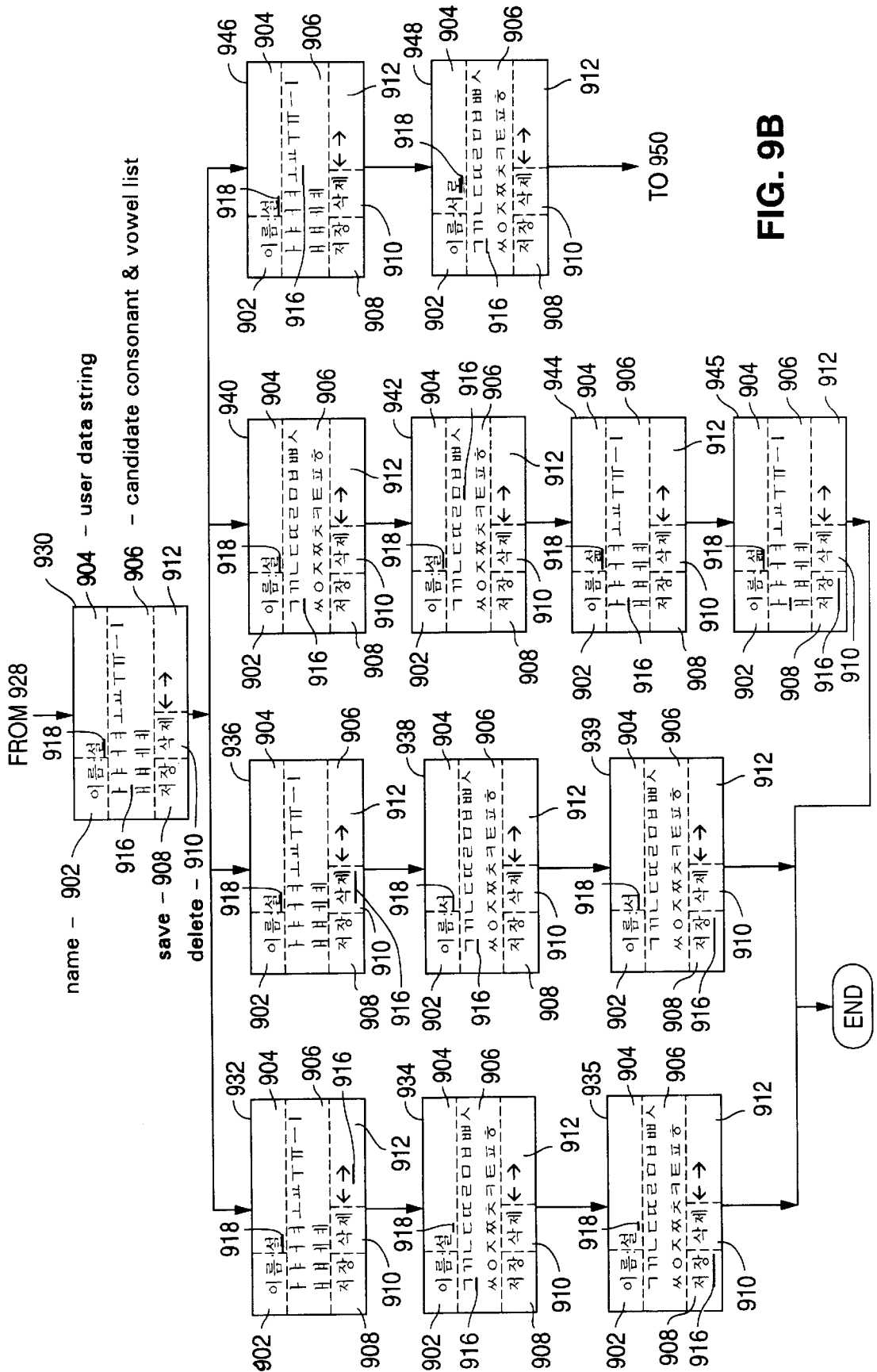
Figure 9C:
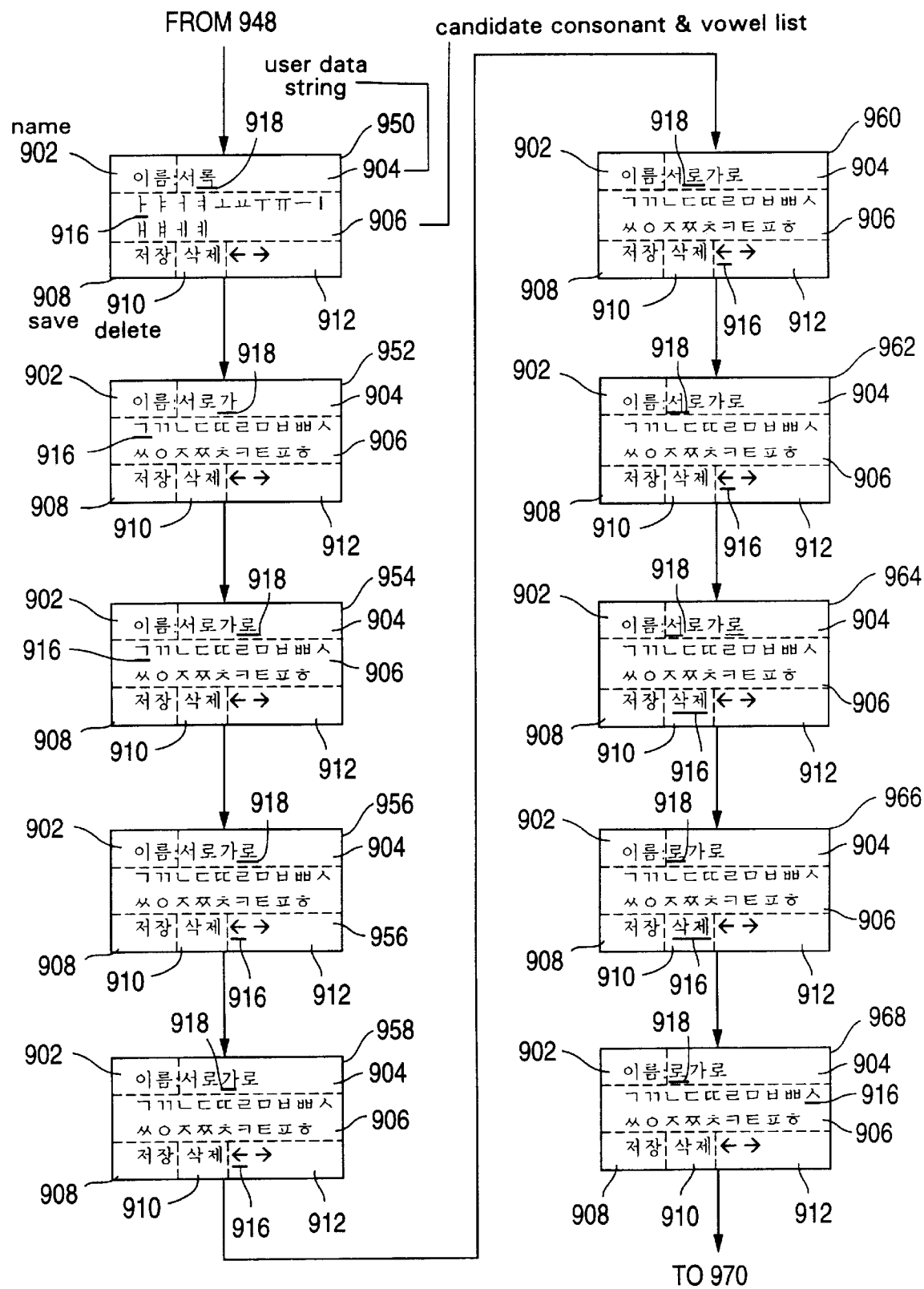
Figure 9D:
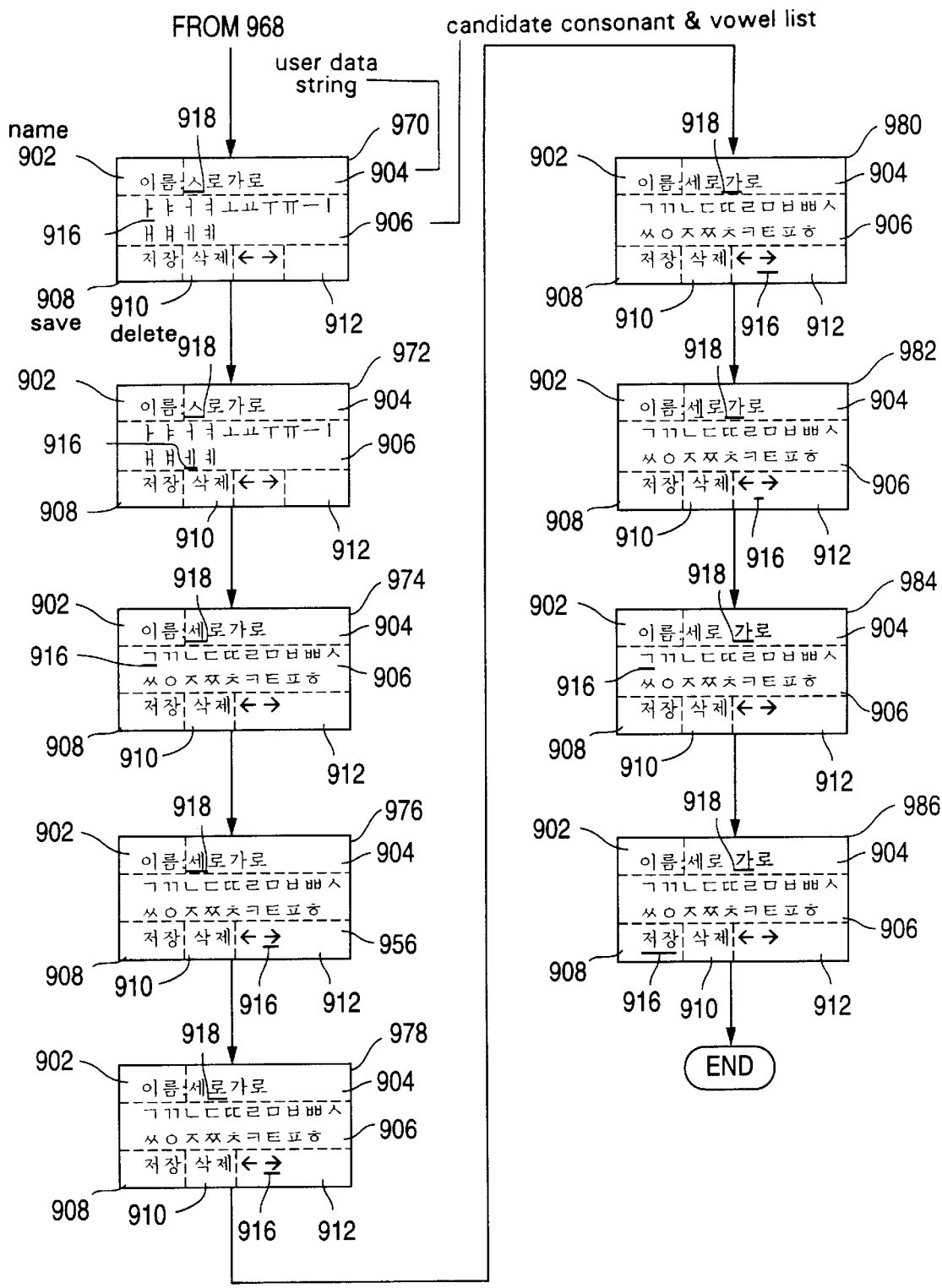

The present invention provides novel methods and apparatuses for entering data strings into electronic devices that have a relatively small display screen and few input keys.

A Hangul character is a single syllabic character formed by combining one or two Hangul consonants with a Hangul vowel. FIG. 1 shows fourteen basic Hangul consonants. FIG. 2 shows sixteen compound Hangul consonants, each of which is formed by combining two or more basic Hangul consonants. FIG. 3 shows ten basic Hangul vowels. FIG. 4 shows eleven compound Hangul vowels, each of which is formed by combining two or more basic Hangul vowels. As shown in FIGS. 1–4, Hangul includes a total of thirty consonants and twenty one vowels. FIG. 5 shows a candidate consonant list including the fourteen basic Hangul consonants and most frequently used four of the sixteen Hangul compound consonants. FIG. 6 shows a candidate vowel list including the ten basic Hangul vowels and most frequently used four of the eleven Hangul compound vowels.

In the present invention, the candidate consonant list and the candidate vowel list are alternatively displayed in a display region so that a user can alternatively select a Hangul consonant and a Hangul vowel from these two lists, respectively. To form a Hangul character, a user can select Hangul components from the candidate consonant list and/or the candidate vowel list. To form a compound Hangul consonant that is not included in the candidate consonant list, after selecting a first basic Hangul consonant from the candidate consonant list, the user re-displays the candidate consonant list and selects a second basic Hangul consonant from the candidate consonant list. Similarly, to form a compound Hangul vowel that is not included in the candidate vowel list, after selecting a first basic Hangul vowel from the candidate vowel list, the user re-displays the candidate vowel list and selects a second basic Hangul vowel from the candidate vowel list.

FIG. 7A shows a front view of a cellular telephone 700, which has the capability of entering Hangul and ASCII characters in accordance with the present invention.

As shown in FIG. 7A, the cellular telephone 700 includes a display screen 702, an antenna 704, and a control panel 706. The control panel 706 includes a jog dial wheel 708 and a key panel 710, including twelve alpha/numeric keys. The jog dial wheel 708 can be moved in three directions (turn-up, turn-down, and press-in), as indicated by the three arrows. The cursor 916, 1016, 1116, 1216, or 1316 (as will be discussed in greater detail in connection with FIGS. 9, 10, 11, 12, and 13) displayed on the display screen 702, can be moved to the left and right by turning the jog dial wheel 708 up and down, respectively. A component (or a command) displayed on the display screen 702 can be selected (or activated) by first moving the cursor 916, 1016, 1116, 1216, or 1316 to the component (or the command) and then pressing-in the jog dial wheel 708.

FIG. 7B shows a side view of the cellular telephone 700 is shown to illustrate the side view of the jog dial wheel 708.

FIG. 8 shows a block diagram 800 to illustrate some components of the cellular telephone 700 shown in FIG. 7A, in accordance with the present invention.

The block diagram 800 includes a processor 804, an I/O (input and output) interface circuit 805, a graphic I/O interface circuit 806, a memory 808, and a bus 810. The processor 804, the I/O interface circuit 805, the graphic I/O interface circuit 806, and the memory 808 are all coupled to the bus 810.

The memory 808 includes: (1) a component storage 813 for storing Hangul components (including Hangul consonants and vowels) and ASCII characters, (2) a data memory 815 for storing data strings entered into the cellular telephone 700, and (3) an application memory 820 for storing an application to form data strings in accordance with the present invention.

The processor 804 controls the operations of the I/O interface circuit 805, the graphic I/O interface circuit 806, the memory 808, and the display region 702. More specifically, the processor 804 is able to: (1) get access to the Hangul components and ASCII characters stored in the component storage 813, (2) interact with the control panel 706 via the I/O interface circuit 805, (3) display the Hangul components and ASCII characters stored in the component storage 813 on the display region 702 via the graphic I/O interface circuit 806, (4) execute the application stored in the application memory 820 to form data strings, and (5) store the data strings in the data memory 815.

In response to a user's movement of the jog dial wheel 708 or a user's press of any key on the key panel 710, the control panel 706 generates a request signal, which is in turn sent to the processor 804 via the I/O interface circuit 805. In response, the processor 804 executes the application stored in the application memory 820, thereby performing a particular function for the request signal.

FIG. 9 shows a sequence of screen shots sequentially displayed on the display screen 702 to illustrate a process of selecting Hangul components, forming Hangul characters, and entering the formed Hangul characters into the cellular telephone 700, in accordance with the present invention.

In describing the process shown in FIG. 9, it is assumed that the cellular telephone is set in a data entering mode for enabling the processor 804 to execute the application stored in the application memory 820, thereby allowing the user to input a first component into the cellular telephone 700. Once the cellular telephone 700 is set in the data entering mode, it can be switched between an appending mode or an editing mode. The cellular telephone 700 is in an appending mode when the user places new data at the end position of a data string. The cellular telephone 700 remains in the appending mode so long as the newly inputted data is placed at a data string's end position, which does not have pre-existing data. The cellular telephone 700 is in an editing mode when the user either inserts or deletes. The input position change over the previously entered data is considered as an editing mode action. Since the cursor 918 (1018 in FIG. 10, 1118 in FIG. 11, 1218 in FIG. 12, and 1318 in FIG. 13) indicates the position of a subsequent operation to a data string, the application can determine whether the cellular telephone 700 should be set in an appending mode or an editing mode by detecting the position of the cursor 918 (1018 in FIG. 10, 1118 in FIG. 11, 1218 in FIG. 12, and 1318 in FIG. 13).

Screen Shot 920

The screen shot 920 has six display regions 902, 904, 906, 908, 910, and 912. The region 902 displays "name" in Hangul. The regions 904 displays the data string entered by a user. The region 906 alternatively displays the candidate consonant list and the candidate vowel list. The region 908 displays a command "save" in Hangul for saving the data string that are displayed in the region 904. The regions 910 displays a command "delete" in Hangul. In an appending mode, the selection of the "delete" command deletes a Hangul component or an ASCII character which was last entered. However, in an editing mode, the selection of the "delete" command deletes a Hangul character (which may include up to four Hangul components) or an ASCII character indicated by the cursor 918, 1018, 1118, 1218, or 1318.

The region 906 contains a cursor 916 and two display lines. Each display line contains ten full-size spaces, and each full-size space contains two half-size spaces. A Hangul character occupies a full-size space, and an ASCII character occupies a half-size space. Since the cellular telephone 700 is currently set in an appending mode to input a first component of a data string, the region 916 displays the candidate consonant list and the cursor 916 points to the first consonant in the candidate consonant list.

The cursor 916 can be moved to the left and right in the regions 906, 908, 910 and, 912, by turning the jog dial wheel 708 up and down, respectively. Specifically, when the cursor 916 is located at the last space of the first display line, further turning the jog dial wheel 708 down moves the cursor 916 to the first space of the second display line. When the cursor 916 is located at the last Hangul character of the second display line, further turning the jog dial wheel 708 down moves the cursor 916 to the region 908. When the cursor 916 is located in the region 908, continuously turning the jog dial wheel 708 down moves the cursor 916 from the region 908 to the region 912 through the region 910. When the cursor 916 is located at the right arrow "→" icon of the region 912, further turning the jog dial wheel 708 down moves the 916 to the first space of the first display line in the region 906.

Similarly, when the cursor 916 is located in the region 912, continuously turning the jog dial wheel 708 up moves the cursor 916 from the region 912 to the region 908 through the region 910. When the cursor 916 is located in the region 908, further turning the jog dial wheel 708 up moves the cursor 916 to the last Hangul character of the second display line. When the cursor 916 is located at the first space of the second display line, further turning the jog dial wheel 708 up moves the cursor 916 to the last space of the first display line. When the cursor 916 is located at the first display line in the region 906, further turning the jog dial wheel 708 up moves the cursor 916 to the right arrow "→" icon in the region 912.

The region 904 has six full-size spaces and contains a cursor 918. The cursor 918 can be moved a full-size space or a half-size space, depending whether the character to be pointed by the cursor 918 is a Hangul character or an ASCII character.

The region 912 displays three symbols, namely a left arrow "←" icon, a "space" character, and a right arrow "→" icon. The selection of the left arrow "←" moves the cursor 918 (1018 in FIG. 10, 1118 in FIG. 11, 1218 in FIG. 12, or 1318 in FIG. 13) one half-size space or one full-size space to the left in the region 904 (1004 in FIG. 10, 1104 in FIG. 11, 1204 in FIG. 12, or 1304 in FIG. 13), depending on whether the character to be pointed by the cursor 918 is a Hangul or an ASCII character. The selection of the "space" character appends or inserts an ASCII space character into the region 904 (1004 in FIG. 10, 1104 in FIG. 11, 1204 in FIG. 12, and 1304 in FIG. 13). The selection of the right arrow "→" icon moves the cursor 918 (1018 in FIG. 10, 1118 in FIG. 11, 1218 in FIG. 12, and 1318 in FIG. 13) one half-size space or one full-size space to the right in the region 904 (1014 in FIG. 10, 1104 in FIG. 11, 1204 in FIG. 12, and 1304 in FIG. 13), depending on whether the character to be pointed by the cursor 918 is a Hangul or an ASCII character. In an appending mode, the selection of right arrow "→" icon also inserts a delimiter indicating completion of a Hangul character.

In the process of entering a Hangul character, the region 906 alternatively displays the candidate consonant and vowel lists without requiring the user's intervention. To re-display a Hangul candidate list previously displayed, the user presses in and holds the jog dial wheel 708, indicating a request to re-display the previous Hangul candidate list. In response, the processor 804 executes the application to switch to the Hangul candidate list previously displayed.

In FIG. 9, all other screen shots have the same layout as screen shot 920.

Screen Shot 922

To select the tenth Hangul consonant from the candidate consonant group, the user moves the cursor 916 to the tenth full-size component of the first display line in the display region 916 and presses in the jog dial wheel 708. In response, the processor 804 executes the application stored in the application memory 820 to select the tenth Hangul consonant from the candidate consonant list and displays the selected Hangul consonant in the region 904. The processor 804 then executes the application to display the candidate vowel list in the region 906.

Screen Shot 924

In the screen shot 924, the consonant selected from the screen shot 922 is displayed in the region 904. In the region 906, the candidate consonant list in the screen shot 922 is automatically replaced by the candidate vowel list, and the cursor 916 automatically points to the first vowel in the candidate vowel list. To select the third vowel from the candidate vowel list, the user moves the cursor 916 to the third full-size component of the first display line in the display region 906 and presses in the jog dial wheel 708. In response, the processor 804 executes the application to select the third Hangul vowel from the candidate vowel list and displays the Hangul vowel selected in the screen shot 924, together with the Hangul consonant selected in the screen shot 922, in the region 904. The processor 804 then executes the application to display the candidate consonant list in the region 906.

Screen Shot 926

In the screen shot 926, a character constructed from the two components selected in the screen shots 922 and 924 is displayed in the region 904. In region 906, the candidate vowel list in the screen shot 924 is automatically replaced by the candidate constant list, and the cursor 916 automatically points to the first vowel in the candidate vowel list.

Screen Shot 928

To select the sixth consonant from the candidate consonant list, the user moves the cursor 916 to the sixth full-size component of the first display line in the region 906 and then presses in the jog dial wheel 708. In response, the processor 804 executes the application to select the sixth Hangul consonant from the candidate consonant list and displays the Hangul consonant selected in the screen shot 928, together with the Hangul components selected in the screen shots 922 and 924, in the region 904. The processor 804 then executes the application to display the candidate vowel list in the region 906.

Screen Shot 930

In the screen shot 930, a character constructed from the three components selected in the screen shots 922, 924 and 928 is displayed in the region 904. In the region 906, the candidate consonant list is automatically replaced by the candidate vowel list, and the cursor 916 automatically points to the first vowel in the candidate vowel list. At the screen shot 930, the process can be led to four paths:

(1) path one, including the screen shots 932, 934, and 935, to enter an explicit delimiter to indicate the completion of a character;
(2) path two, including the screen shots 936, 938, and 939, to delete the last component previously entered;
(3) path three, including the screen shots 940, 942, 944, and 945, to construct a compound consonant; and
(4) path four, including 946, 948, 950, 952, 954, 956, 958, 960, 962, 964, 966, 968, 970, 972, 974, 976, 978, 980, 982, 984, and 986, to further enter Hangul and ASCII characters.

Screen Shot 932

To indicate that the three selected components has formed the first Hangul character, the user moves the cursor 906 to the right arrow "→" icon in the region 912 and presses-in the jog dial wheel 708. The right arrow "43 " icon is an explicit delimiter to indicate the completion of a character. In response, the processor 804 executes the application to move the cursor 918 one full-size space to the right in the region 904. The processor then executes the application to display the candidate consonant list on the region 906.

Screen Shot 934

In the screen shot 934, the cursor 918 is moved a full-size space to the right, and the candidate vowel list in the screen shot 932 is automatically replaced by the candidate consonant list.

Screen Shot 935

To save the data string shown in the screen shot 934, the user moves the cursor 916 to the region 908 and then presses-in the jog dial wheel 708. In response, the processor 804 executes the application to save the data string shown in the screen shot 934 into the data memory 815.

Screen Shot 936

To delete the Hangul component that was last entered, the user moves the cursor 916 to the region 910 and presses-in the jog dial wheel 708. Since the cellular telephone 700 is now in an appending mode, the processor 804 executes the application to delete the last Hangul component previously entered. The processor 804 then executes the application to display the candidate consonant list in the region 906.

Screen Shot 938

As shown in the screen shot 938, the last Hangul component previously entered is deleted. The candidate vowel list in the screen shot 936 is automatically replaced by the candidate consonant list.

Screen Shot 939

To save the data string shown in the screen shot 938, the user moves the cursor 916 to the region 908 and then presses in the jog dial wheel 708. In response, the processor 804 executes the application to save the data string shown in the screen shot 938 into the data memory 815.

Screen Shot 940

The screen shot 940 is the continuation of the screen shot 930. To construct a compound consonant, the user presses-in and holds the jog dial wheel 708. The application is able to recognize that this act is a request to construct a compound Hangul component. Since the previously entered Hangul component is a consonant, the application recognizes that the user wishes to construct a compound consonant. Thus, the processor 804 executes the application to re-display the candidate consonant list.

Screen Shot 942

In the screen shot 942, the candidate consonant list is re-displayed in the region 906. To select the seventh consonant from the candidate consonant list, the user moves the cursor 916 to the seventh full-size component of the first display line in the region 906 and presses-in the jog dial wheel 708. It should be noted that, to the existing cellular telephones, two consecutively entered consonants are invalid as a whole independent Hangul character. However, the application stored in the application memory 820 is able to recognize that these two consecutively entered consonants here are meant to construct a compound consonant. Thus, the processor 804 executes the application to: (1) select the seventh consonant from the candidate constant list, (2) combine the consonant selected in the screen shot 928 with the consonant selected in the screen shot 942 to constructed compound consonant, (3) display the constructed consonant, together with the two components in the screen shots 922 and 924, in the region 904, and (4) display the candidate vowel list in the region 906.

Screen Shot 944

In the screen shot 944, a character constructed from the components selected in the screen shots 922, 924, 928 and 942 is displayed in the region 904. The two consonants selected in the screen shots 928 and 842 forms a compound consonant. The candidate consonant list in the screen shot 942 is automatically replaced by the candidate vowel list.

Screen Shot 945

To save the data string shown in the screen shot 944, the user moves the cursor 916 to the region 908 and then presses-in the jog dial wheel 708. In response, the processor 804 executes the application to save the data string shown in the screen shot 944 into the data memory 815.

Screen Shot 946

The screen shot 946 is the continuation of the screen shot 930. To select the fifth vowel from the candidate vowel list, the user moves the cursor 916 to the fifth full-size component of the first display line in the region 906 and then presses-in the jog dial wheel 708. Even though no explicit delimiter is entered in the screen shot 930, the application is able to recognize the consonant last entered is the first consonant for the vowel selected in the screen shot 946. Therefore, the processor 804 executes the application to: (1) move the last consonant from the preceding character, (2) select the fifth vowel from the candidate vowel list, (3) display the vowel selected in the screen shot 946, together with the moved consonant, in the position indicated by the cursor 918 in the region 904, and (4) display the candidate consonant list in the region 906.

Screen Shot 948

As shown in the screen shot 948, the vowel selected in the screen shot 946, together with the consonant moved from the preceding Hangul character, is now displayed in the second full-size space in the region 904. The candidate vowel list in the screen shot 946 is automatically replaced by the candidate consonant list, and the cursor 916 automatically points to the first consonant in the candidate consonant list. To select the first consonant from the candidate consonant list, the user presses in the jog dial wheel 708. In response, the processor 804 executes the application to select the first consonant from the candidate consonant list and display it, together with the two components previously selected, in the region 904. The processor 804 then executes the application to display the candidate vowel list in the region 906.

Screen Shot 950

In the screen shot 950, a second Hangul character is constructed and displayed in the second full-size space in the region 904. The candidate consonant list in the screen shot 948 is automatically replaced by the candidate vowel list, and the cursor 916 automatically points to the first vowel of the candidate vowel list. Without entering a delimiter, the user presses-in the jog dial wheel 708 to select the first vowel of the candidate vowel list. Even though no explicit delimiter is entered for the preceding Hangul character, the application is able to recognize that the consonant last entered is the first consonant for the vowel selected in the screen shot 950. Therefore, the processor 804 executes the application to: (1) move the last consonant from the preceding character, (2) select the first vowel from the candidate vowel list, (3) display the selected vowel, together with the moved consonant, in the position indicated by the cursor 918 in the region 904, and (4) display the candidate consonant list in the region 906.

Screen Shot 952

As shown in the screen shot 952, a third Hangul character is constructed and displayed in the third full-size space in the region 904. The candidate towel list in the screen shot 950 is automatically replaced by the candidate consonant list, and the cursor 916 automatically points to the first consonant in the candidate consonant list. The user can now use the same steps as shown the screen shots 948 and 950 to enter a fourth Hangul character shown in the screen shot 954.

Screen Shot 954

In the screen shot 954, the fourth Hangul character is displayed in the region 904. If needed, the user can add consonant(s) on the forth character making the forth character to be different from the second character. At this point, assume that the user recognizes the first Hangul character was erroneously entered.

Screen Shot 956

To delete the Hangul character located in the first full-size space in the region 904, the user moves the cursor 916 to the left arrow "←" icon in the region 912 and presses-in the jog dial wheel 708. In response, the processor 804 executes the application to move the cursor 918 one full-size space to the left in the region 904. Since the cursor 918 is moved to a position where a pre-existing character exists, the application realizes the user wishes to make changes to the data string that was entered. Thus, the processor executes the application to switch the cellular telephone 700 from an appending and an editing mode.

Screen Shot 958

As shown in the screen shot 958, the cursor 918 is moved from the fourth full-size space to the third full-size space in the region 904. To further move the cursor 918, the user presses in the jog dial wheel 708 again while the cursor 916 is still on the left arrow "←". In response, the processor 804 executes the application to move the cursor 918 from the third full-size space to the second full-size space in the region 904.

Screen Shot 960

As shown in the screen shot 960, the cursor 918 is moved from the third full-size space to the second full-size space in the region 904. To further move the cursor 918, the user presses in the jog dial wheel 708 again while the cursor 916 is still on the left arrow "←". In response, the processor 804 executes the application to move the cursor 916 from the second full-size space to the first full-size space in the region 904.

Screen Shot 962

As shown in the screen shot 962, the cursor 918 is moved from the second full-size space to the first full-size space in the region 904.

Screen Shot 964

To delete the character located in the first full-size space in the region 904, the user moves the cursor 916 to the region 910 and then presses in the jog dial wheel 708. Since the cellular telephone is now in the editing mode, the processor 804 executes the application to delete the first character (which may include more than one Hangul component) from the first full-size space and move the remaining three characters one full-size space to the left in the region 904.

Screen Shot 966

In the screen shot 966, the first Hangul character shown in the screen shot 964 is deleted, and the remaining three Hangul characters are moved one full-size space to the left in the region 904.

Screen Shot 968

To select the tenth consonant from the candidate consonant list, the user moves the cursor 916 to the tenth full-size component of the first display line in the region 906 and then presses-in the jog dial wheel 708. In response, the processor 804 executes the application to: (1) move the existing three characters one full-size space to the right in the region 904, (2) insert the selected consonant into the first full-size space in the region 904, and (3) display the candidate vowel list in the region 906.

Screen Shot 970

In the screen shot 968, the three existing characters are moved one full-size space to the right and the consonant selected in the screen shot 968 is inserted into the first full-size space in the region 904. The candidate consonant list in the screen shot 968 is automatically replaced by the candidate vowel list, and the cursor 916 automatically points to the first vowel in the candidate vowel list.

Screen Shot 972

To select the thirteenth vowel (a compound vowel) from the candidate vowel list, the user moves the cursor 916 to the third full-size component of the second display line in the region 906 and then presses in the jog dial wheel 708. In response, the processor 804 executes the application to select the vowel and display the compound vowel selected in the screen shot 972, together with the consonant selected in the screen shot 968, in the first fullsize space in the region 904. The processor 804 then executes the application to display the candidate consonant list in the region 906.

Screen Shot 974

In the screen shot 974, a character constructed from the consonant selected in the screen shot 968 and the compound vowel selected in the screen shot 972 is displayed in the first full-size space in the region 904. The candidate vowel list in the screen shot 972 is automatically replaced by the candidate consonant list, and the cursor 916 automatically points to the first consonant in the candidate consonant list.

Screen Shot 976

To place an explicit delimiter for the Hangul character inserted, the user moves the cursor 916 to the right arrow "→" icon in the region 912 and then presses-in the jog dial wheel 708. In response, the processor 804 executes the application to acknowledge completion of inserting the Hangul character and move the cursor 918 from the first full-size space to the second full-size space in the region 904.

Screen Shot 978

In the screen shot 978, the cursor 918 is moved to the second full-size space in the region 904. To further move the cursor 918 one full-size space to the right in the region 904, the user presses in the jog dial wheel 708. In response, the processor 804 executes the application to move the cursor 918 one full-size space to the right in the region 904.

Screen Shot 980

In the screen shot 980, the cursor 918 is moved from the second full-size space to the third full-size space in the region 904.

Screen Shot 982

To insert an ASCII space, the user moves the cursor 916 to the "space" character in the region 912 and then presses in the jog dial wheel 708. The application is able to recognize that the "space" character is an ASCII character. Thus, the processor 804 executes the application to move the third and fourth Hangul characters one half-size space to the right and insert a half-size space before the third Hangul character.

Screen Shot 984

In the screen shot 984, a half-size space is inserted before the third Hangul character in the region 904.

Screen Shot 986

In the screen shot 986, the cellular telephone 700 still remains in the editing mode. To save the data string shown in the screen shot 984, the user moves the cursor 916 to the region 908 and presses in the jog dial. In response, the processor 804 executes the application to store the data string into the data memory 815, ending the text entering session.

Figure 10:
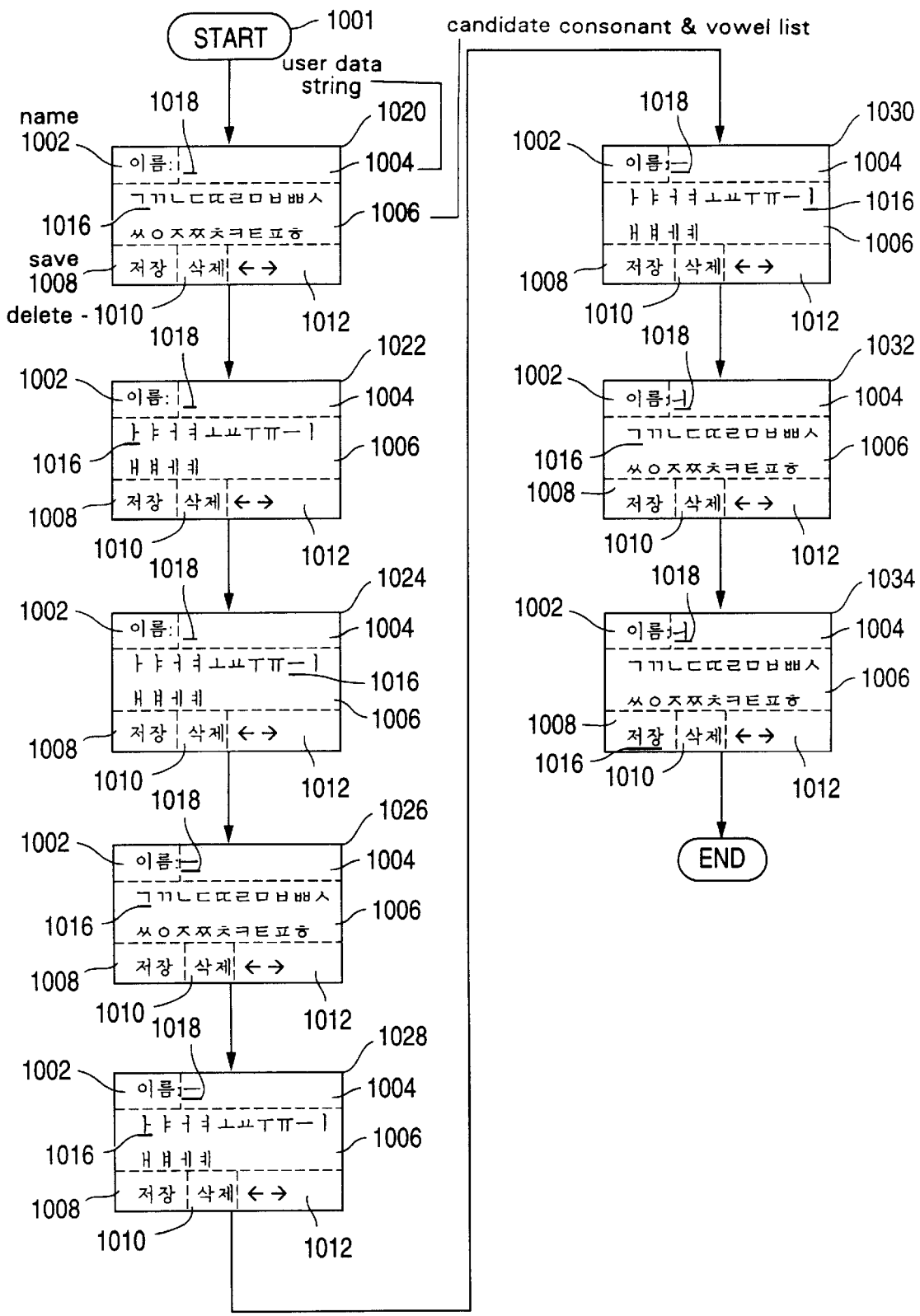
FIG. 10 depicts a sequence of screen shots, illustrating a process of constructing a compound vowel, in accordance with the present invention.

FIG. 10 shows a sequence of screen shots sequentially displayed on the display screen 702 to illustrate a process of constructing a compound vowel, in accordance with the present invention. In describing the process shown in FIG. 9, it is assumed that the cellular telephone 700 is set to an appending entering mode for enabling the processor 804 to execute the application stored in the application memory 820, thereby allowing the user to input a first component into the cellular telephone 700.

Screen Shot 1020

The screen shot 1020 contains six display regions 1002, 1004, 1006, 1008, 1010, and 1012. The structures and functions of the regions 1002, 1004, 1006, 1008, 1010, and 1012 are the same as those of regions 902, 904, 906, 908, 910, and 912 shown in FIG. 9. The screen shot 1020 further contains two cursors 1016 and 1018. The operations of the cursors 1016 and 1018 are the same as those of cursors 916 and 918 shown in FIG. 9.

Since the cellular telephone 700 is set in an appending mode to enter a first component in a data string, the region 1006 displays the candidate consonant list, and the cursor 1016 points to the first consonant of the candidate consonant list.

To select a vowel from the candidate vowel list as a first component, the user presses in and holds the jog dial wheel 804. In response, the processor 804 executes the application to replace the candidate consonant list with the candidate vowel list in the region 1006.

Screen Shot 1022

In the screen shot 1022, the candidate consonant list is replaced by the candidate vowel list. The cursor 1016 points to the first vowel in the candidate vowel list.

Screen Shot 1024

To select the ninth vowel from the candidate vowel list, the user moves the cursor 1016 to the ninth full-size component of the first display line in the region 1006 and presses in the jog dial wheel 708. In response, the processor 804 executes the application to select the first vowel from the candidate vowel list and display the selected vowel in the region 1004. The processor 804 then executes the application to display the candidate consonant list in the region 1006.

Screen Shot 1026

In the screen shot 1026, the vowel selected in the screen shot 1024 is displayed in the region 1004. The candidate vowel list is automatically replaced by the candidate consonant list, and the cursor 1016 automatically points to the first consonant in the candidate consonant list.

To construct a compound vowel, the user presses-in and holds the jog dial wheel 708. The application is able to recognize this act as a request to switch the candidate list. Since the previously entered Hangul component is a vowel, the application recognize that the user is requesting to construct a compound vowel. Thus, the processor 804 executes the application to re-display the candidate vowel list.

Screen Shot 1028

In the screen shot 1028, the candidate vowel list is displayed in the region 1006.

Screen Shot 1030

To select the tenth vowel from the candidate vowel list, the user moves the cursor 1016 to the tenth full-size component of the first display line in the region 1006 and then presses in the jog dial wheel 708. It should be noted that, to the existing cellular telephones, two consecutively entered vowels are invalid as the first component of a character or as a whole character. However, the application stored in the application memory 820 is able to recognize that these two consecutively entered vowels here are meant to construct a compound vowel. Thus, the processor 804 executes the application to: (1) select the tenth vowel from the candidate vowel list, (2) combine the vowel selected in the screen shot 1024 with the vowel selected in the screen shot 1030 to construct a compound vowel, (3) display the constructed vowel in the region 1004, and (4) display the candidate consonant list in the region 1006.

Screen Shot 1032

In the screen shot 1032, the compound vowel constructed from the vowels selected in the screen shots 1024 and 1030 is displayed in the region 1004. The candidate vowel list in the screen shot 1030 is automatically replaced by the candidate consonant list.

Screen Shot 1034

To save the compound vowel, the user moves the cursor 1016 to the region 1008 and presses-in the jog dial wheel 708. In response, the processor 804 executes the application to save the compound vowel in the data memory 815.

Figure 11A:
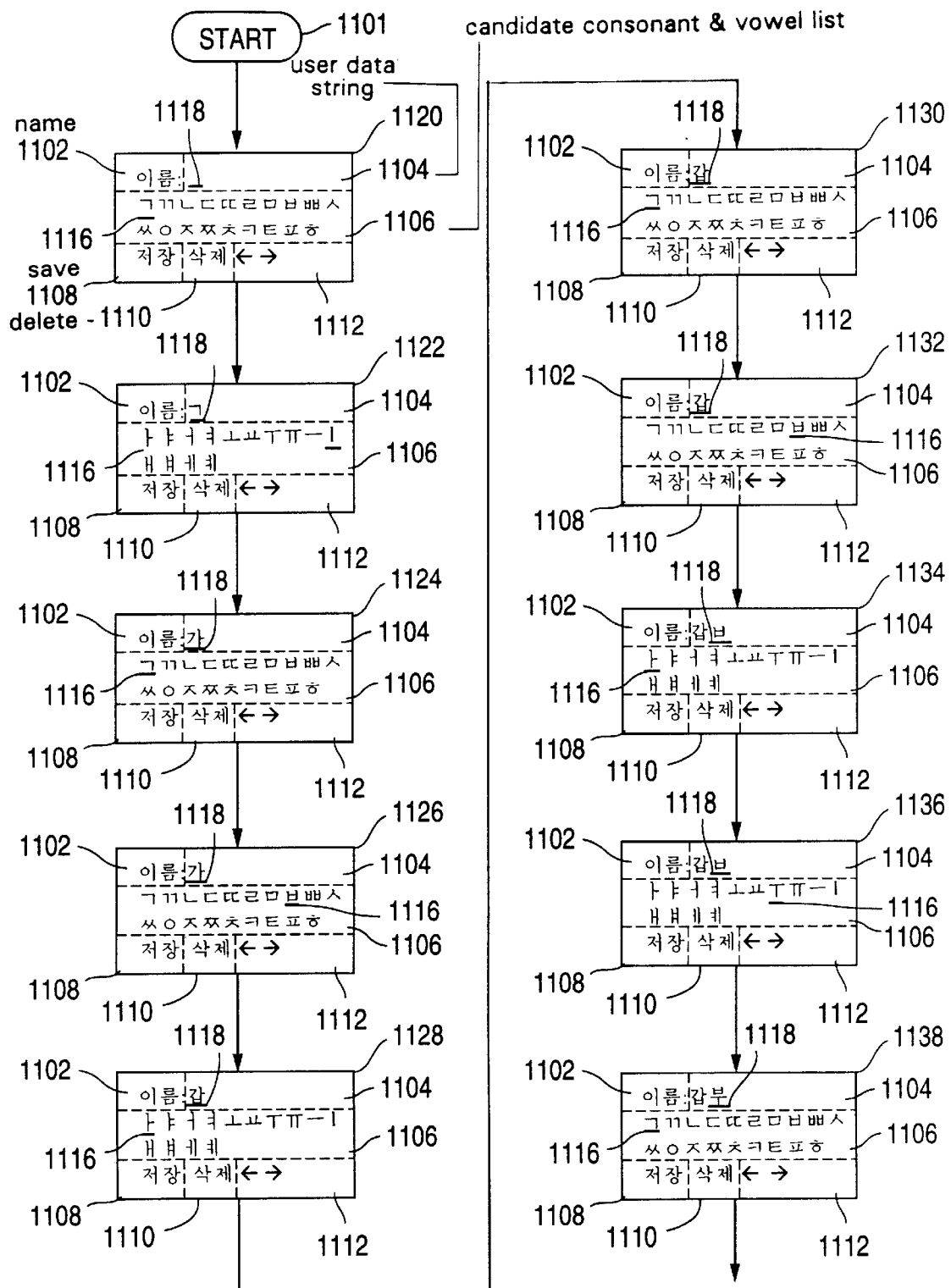
FIG. 11 depicts a sequence of screen shots, illustrating a process of entering a data string including both the Hangul and ASCII characters, in accordance with the present invention.
Figure 11B:
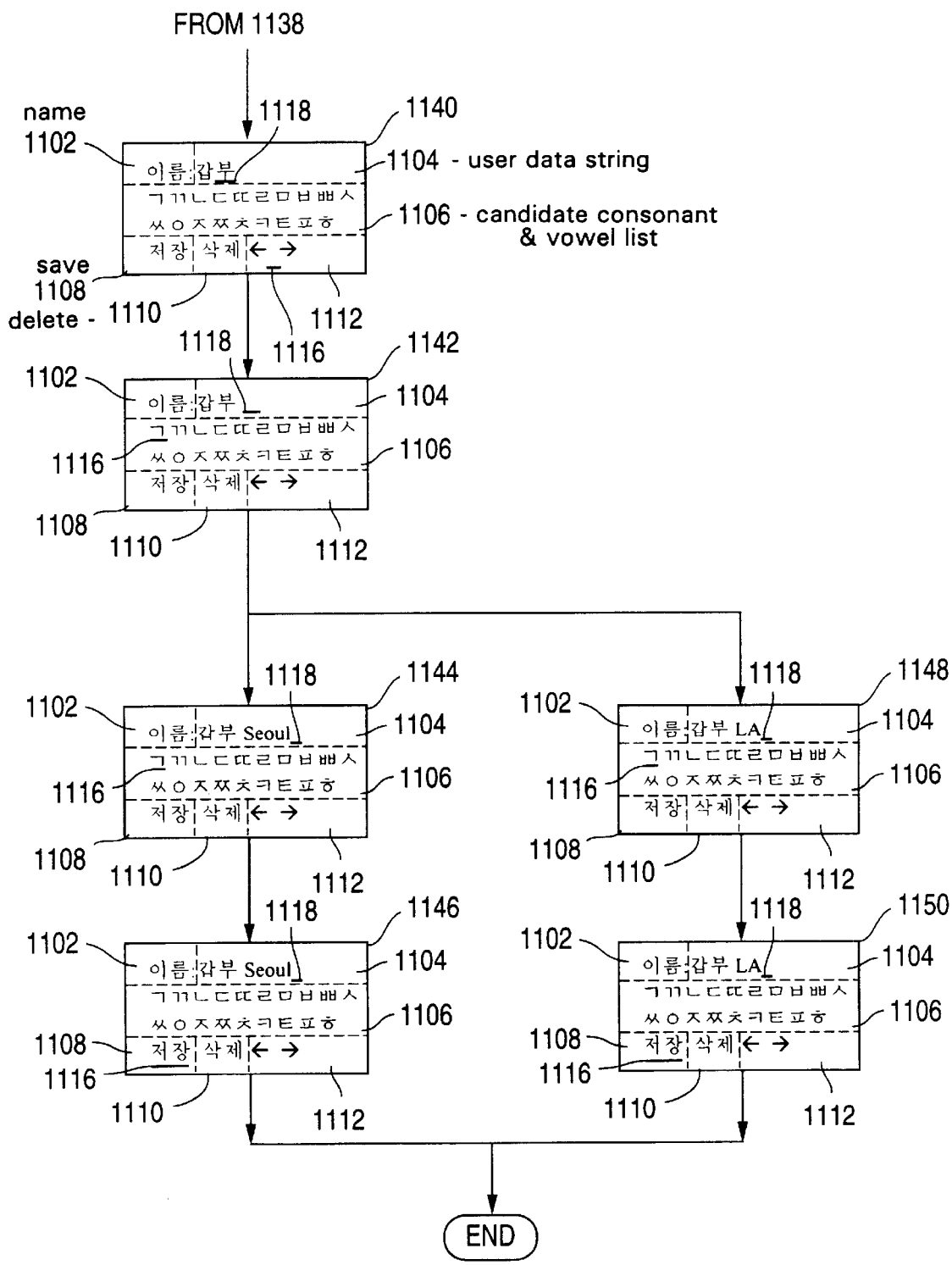

FIG. 11 shows a sequence of screen shots sequentially displayed on the display screen 702 to illustrate a process of entering a data string containing both Hangul and ASCII characters into the cellular telephone 700, in accordance with the present invention.

In describing the process shown in FIG. 11, it is assumed that the cellular telephone 700 is set in an appending mode, enabling the processor 804 to execute the application stored in the application memory 820, thereby allowing a user to input a first component into the cellular telephone 700.

Screen Shot 1120

The screen shot 1120 contains six display regions 1102, 1104, 1106, 1108, 1110, and 1112. The structures and functions of the regions 1102, 1104, 1106, 1108, 1110, and 1112 are the same as those of regions 902, 904, 906, 908, 910, and 912 shown in FIG. 9. The screen shot 1120 further contains two cursors 1116 and 1118. The operations of cursors 1116 and 1118 are the same as those of cursors 916 and 918 shown in FIG. 9.

Since the cellular telephone 700 is set to enter the first component of a character string, the region 1106 displays the candidate consonant list, and the cursor 1116 points to the first consonant of the candidate consonant list.

To select the first consonant in the candidate consonant list, the user presses in the jog dial wheel 708. In response, the processor 804 executes the application to select the first consonant from the candidate consonant list and display the selected consonant in the region 1104. The processor 804 then executes the application to display the candidate vowel list in the region 1106.

Screen Shot 1122

In the screen shot 1122, the consonant selected in the screen shot 1020 is displayed in the region 1104. Since selected consonant is a Hangul component, the application displays it in full-size. In the region 1106, the candidate consonant list in the screen shot 1120 is automatically replaced by the candidate vowel list, and the cursor 1116 automatically points to the first vowel in the candidate vowel list. To select the first vowel from the candidate vowel list, the user presses in the jog dial wheel 708. In response, the processor 804 executes the application to select the first vowel from the candidate vowel list and display the vowel selected in the screen shot 1122, together with the consonant selected in the screen shot 1120, in the region 1104. The processor 804 then executes the application to display the candidate consonant list in the region 1106.

Screen Shot 1124

In the screen shot 1124, a character constructed from the two components selected in the screen shots 1120 and 1122 is displayed in the region 1104. In the region 1106, the candidate vowel list is automatically replaced by the candidate consonant list.

Screen Shot 1126

To select the eighth consonant from the candidate consonant list, the user moves the cursor 1116 to the eighth full-size component of the first display line in the region 1106 and presses-in the jog dial wheel 708. In response, the processor 804 executes the application to select the eighth consonant from the candidate consonant list and displays the consonant selected in the screen shot 1126, together with the two components selected in the screen shot 1120 and 1122, in the region 1104. The processor 804 then executes the application to display the candidate vowel list in the region 1106.

Screen Shot 1128

In the screen shot 1128, a character constructed from the three components selected in the screen shots 1120, 1122 and 1126 is displayed in the region 1104. In the region 1106, the candidate consonant list in the screen shot 1126 is automatically replaced by the candidate vowel list, and the cursor 1116 automatically points to the first vowel in the candidate vowel list. To re-display the candidate consonant list, the user presses-in and holds the jog dial wheel 708. In response, the processor 804 executes the application to re-display the candidate consonant list in the region 1106 so that the user can select a consonant to start a trailing character.

Screen Shot 1130

In the screen shot 1130, the candidate consonant list is displayed in the region 1106, and the cursor 1116 automatically points to the first consonant in the candidate consonant list.

Screen Shot 1132

To select the eighth consonant from the candidate consonant list, the user moves the cursor 1116 to the eighth full-size component in the first display line in the region 1106 and presses in the jog dial wheel 708. Since the previously selected component is also a Hangul consonant and the cellular telephone 700 is in an appending mode, the processor 804 executes the application to: (1) move the cursor 1118 one full size to the right in the region 1104 to input a new character, (2) select the eighth consonant from the candidate consonant list, (3) display the selected consonant in the region 1104 in the position indicated by the cursor 1118, and (4) display the candidate vowel list in the region 1106.

Screen Shot 1134

In the screen shot 1134, the consonant selected in the screen shot 1132 is displayed in the region 1104. The candidate consonant list in the screen shot 1132 is automatically replaced by the candidate vowel list, and the cursor 1116 automatically points to the first vowel in the candidate vowel list.

Screen Shot 1136

To select the seventh vowel from the candidate vowel list, the user moves the cursor 1116 to the seventh full-size component of the first display line in the region 1106 and then presses in the jog dial wheel 708. In response, the processor 804 executes the application to select the seventh vowel from the candidate consonant list and display the vowel selected in the screen shot 1136, together with the consonant selected in the screen shot 1132, in the region 1104. The processor 804 then executes the application to display the candidate consonant list in the region 1106.

Screen Shot 1138

In the screen shot 1138, a character constructed from the two components selected in the screen shots 1132 and 1136 are displayed in the region 1106. The candidate vowel list in the screen shot 1136 is automatically replaced by the candidate consonant list, and the cursor 1116 automatically points to the first consonant in the candidate consonant list.

Screen Shot 1140

To append a half-size space, the user moves the cursor 1116 to the "space" character in the region 1112 and presses-in the jog dial wheel 708. The application is able to recognize the "space" character in the region 1112 is an ASCII character. Thus, the processor 804 executes the application to move the cursor 1118 a half-size space to the right in the region 1104.

Screen Shot 1142

In screen shot 1142, the cursor 1118 is moved a half-size space to the right in the region 1104 since the "space" in the region 1112 is an ASCII character. At the screen shot 1142, the process are led to two paths:

(1) path one: the screen shots 1144 and 1146, and (2) path two: the screen shots 1148 and 1150.

Screen Shot 1144

As shown in the screen shot 1144, from the key panel 710, the user sequentially selects "S", "e", "o", "u", and "l". The application is able to recognize that each of the selections from the key panel 710 is an ASCII character input. Thus, the processor 804 executes the application to sequentially select the ASCII symbols "S", "e", "o", "u", and "l" in response to the selections on the key panel 710, and display each of them in a half-size space in the region 1104. Since the inputted components are ASCII characters, the candidate list displayed in the region 1106 will not be changed.

It should be noted that eight of the ten alpha/numeric keys on the key panel 710 are mapped to multiple ASCII characters. For example, the numeric key "2" is mapped to seven ASCII characters, including "A", "B", "C", "a", "b", "c", and "2". By continuously pressing the numeric key "2", the user can choose any one of the seven ASCII characters. In response to user's continuous presses on the numeric key "2", the application consecutively scrolls and selects among these seven letters. This principle also applies to the operations on the numeric keys "3–9".

Screen Shot 1146

To save the data string as shown in the screen shot 1144, the user moves the cursor 1116 to the region 1108 and presses in the jog dial wheel 708. In response, the processor 804 executes the application to store the data string into the data memory 815.

Screen Shot 1148

As shown in the screen shot 1148, from the key panel 710, the user sequentially selects "L" and "A". Since the selection is from the key panel 710, the processor 804 executes the application to sequentially select the ASCII symbols "L" and "A" in response to the selections on the key panel 710, and display each of them in a half-size space in the region 1104. Since the inputted components are ASCII characters, the candidate list displayed in the region 1106 will not be changed.

Screen Shot 1150

To save the data string as shown in the screen shot 1148, the user moves the cursor 1116 to the region 1108 and presses-in the jog dial wheel 708. In response, the processor 804 executes the application to store the data string into the data memory 815.

It should be noted that in the example shown in FIG. 11, the ASCII characters are appended at the end of the data string. However, using the principle shown in the present invention, an ASCII character can be entered before a Hangul character or between two Hangul characters.

Figure 12:
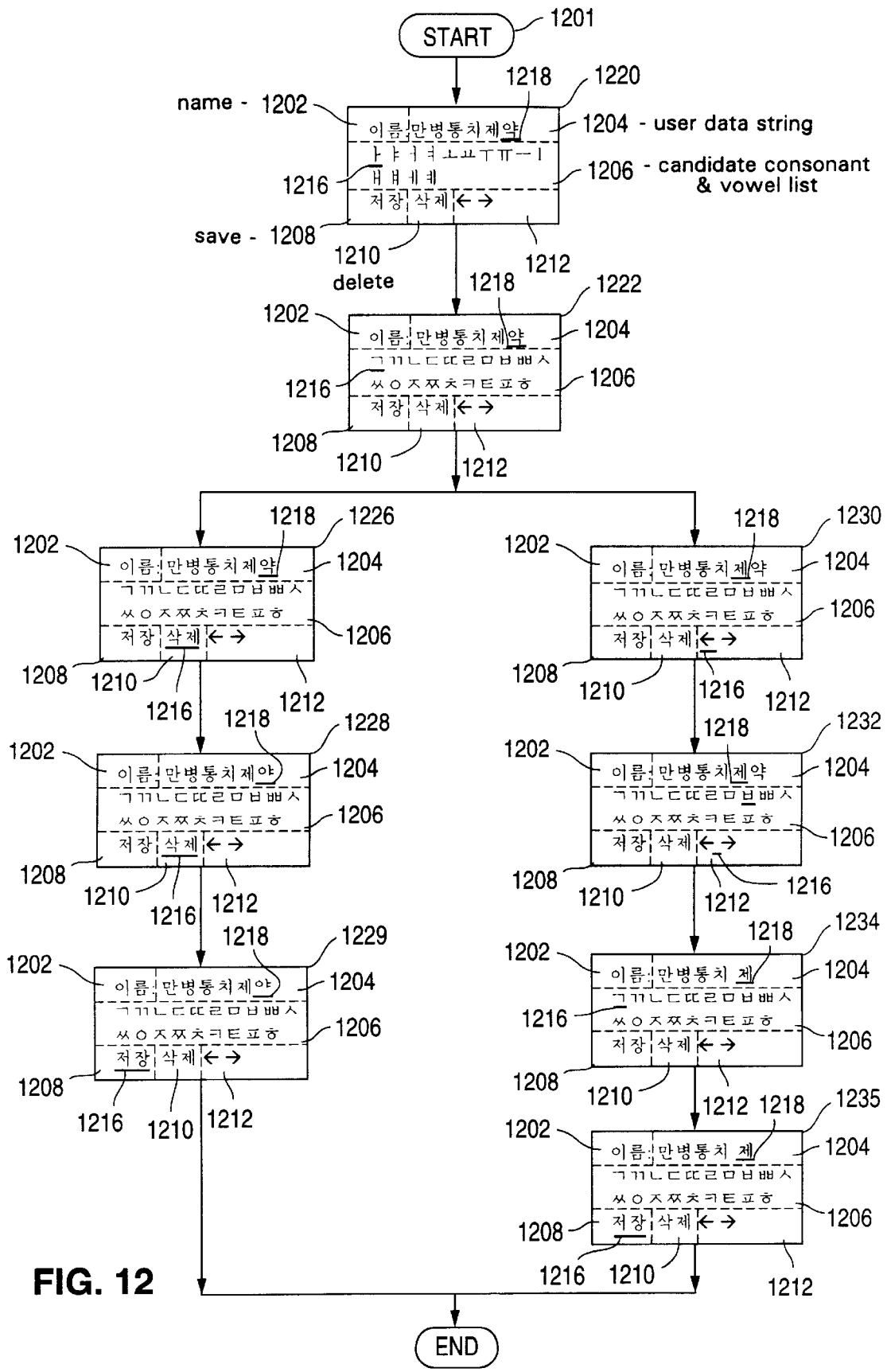
FIG. 12 depicts a sequence of screen shots, illustrating a process of behavior of the cellular telephone when there is no room for further entering characters, in accordance with the present invention.

FIG. 12 shows a sequence of screen shots is shown sequentially displayed on the display screen 702 to illustrate behavior of the cellular telephone 700 when there is no room in a character display region for further entering characters, in accordance with the present invention. In describing the process shown in FIG. 12, it is assumed that the cellular telephone 700 is set in an appending mode.

Screen Shot 1220

The screen shot 1220 contains six display regions 1202, 1204, 1206, 1208, 1210, and 1212. The structures and functions of regions 1202, 1204, 1206, 1210, 1208, and 1212 are the same as those of regions 902, 904, 906, 908, 910, and 912 shown in FIG. 9. The screen shot 1220 further contains two cursors 1216 and 1218. The operations of the cursors 1216 and 1218 are the same as those of cursors 916 and 918 shown in FIG. 9.

The region 1204 contains a data string having six Hangul characters, and the cursor 1218 points the last Hangul character in the data string. Since the region 1204 contains six full-size spaces or twelve half-size spaces, there is no room for appending any further characters. After the sixth Hangul character is entered, the cellular telephone 700 remains in the appending mode. Thus, the application does not respond to the actions of: (1) pressing in the jog dial wheel 708 to activate right arrow "→" icon in the region 1212, (2) pressing in the jog dial wheel 708 to select "space" character in the region 1212, and (3) selecting any keys on the key panel 710. However, the application still responds to the actions of: (1) pressing in and holding the jog dial wheel 708, and (2) pressing in the jog dial wheel 708 to activating the left arrow "←" icon in the region 1212.

To display the candidate consonant list, a user presses in and holds the jog dial wheel 708. In response, the processor 804 executes the application to display the candidate consonant list in the region 1206.

Screen Shot 1222

In the screen shot 1222, the candidate vowel list shown in the screen shot 1220 is replaced by the candidate consonant list. At the screen shot 1222, the process is led to two paths:

(1) path one, including screen shots 1226, 1228, and 1229, to delete the last entered component in the region 1204 under an appending mode; and (2) path two, including screen shots 1230, 1232, 1234, and 1235, to insert components in the data string in the region 1204 under an editing mode.

Screen Shot 1226

To delete the last entered component in the region 1204, the user moves the cursor 1216 to the region 1210 and then presses in the jog dial wheel 708. Since the cellular telephone 700 is in the appending mode, the processor 804 executes the application to delete the one Hangul component last entered in the region 1204.

Screen Shot 1228

As shown in the screen shot 1228, the last entered component is deleted.

Screen Shot 1229

To save the data string as shown in the screen shot 1228, the user moves the cursor 1216 to the region 1208 and presses in the jog dial wheel 708. In response, the processor 804 executes the application to store the data string into the data memory 815.

Screen Shot 1230

To insert a character before the fifth character in the region 1204, the user moves the cursor 1216 to the left arrow "←" icon in the region 1210 and then presses in the jog dial wheel 708. In response, the processor 804 executes the application to move the cursor 1218 one full-size space to the left in the region 1204. Since the cursor 1218 is moved into the data string, the application recognizes the user wishes to insert or delete one or more characters. Thus, the processor 804 executes the application to switch the cellular telephone 700 from the appending mode to the editing mode.

Screen Shot 1232

In the screen shot 1232, the cursor 1218 is moved so that it points to the fifth character. To insert a "space" character, the user moves the cursor 1216 to the "space" character in the region 1212 and then presses in the jog dial wheel 708. In response, the processor 804 executes the application to move the fifth and sixth characters one half-size space (since the "space" character is an ASCII character) to the right and insert a "space" character before the fifth character. At the same time, the processor 804 executes the application to drop the last character (i.e. the sixth character) to keep the data string within the maximum length of the region 1204.

Screen Shot 1234

In the screen shot 1234, a half-size space is inserted before the fifth character in the region 1204. At this point, the user can insert up to three more half-size characters, in any combinations of: (1) one half-size character, (2) two half-size characters, (3) one full-size character, (4) one half-size and one full-size characters and (5) three half-sizes characters. The character at the end of the data string will be dropped as the insertion continues.

It should be noted that if a Hangul character is inserted into a middle position of the data string, the character at the end of the data string will also be dropped.

Screen Shot 1235

To save the data string as shown in the screen shot 1234, the user moves the cursor 1216 to the region 1208 and then presses in the jog dial wheel 708. In response, the processor 804 executes the application to store the data stream in the data memory 815.

Figure 13A:
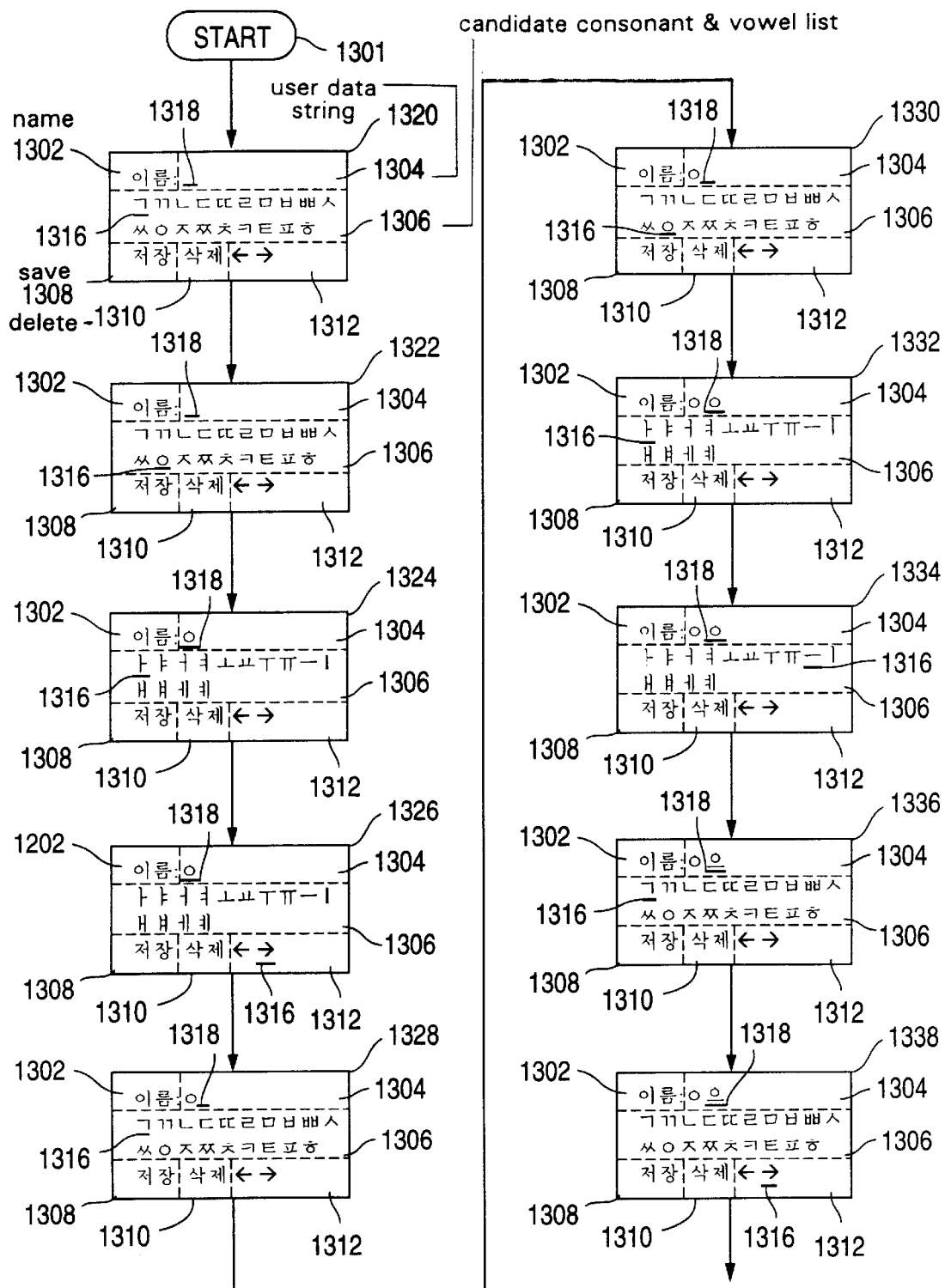
FIG. 13 depicts a sequence of screen shots, illustrating a process of entering a data string containing unusual Hangul consonant combinations that are invalid to conventional cellular telephones but valid to the cellular telephone in accordance with the present invention.
Figure 13B:
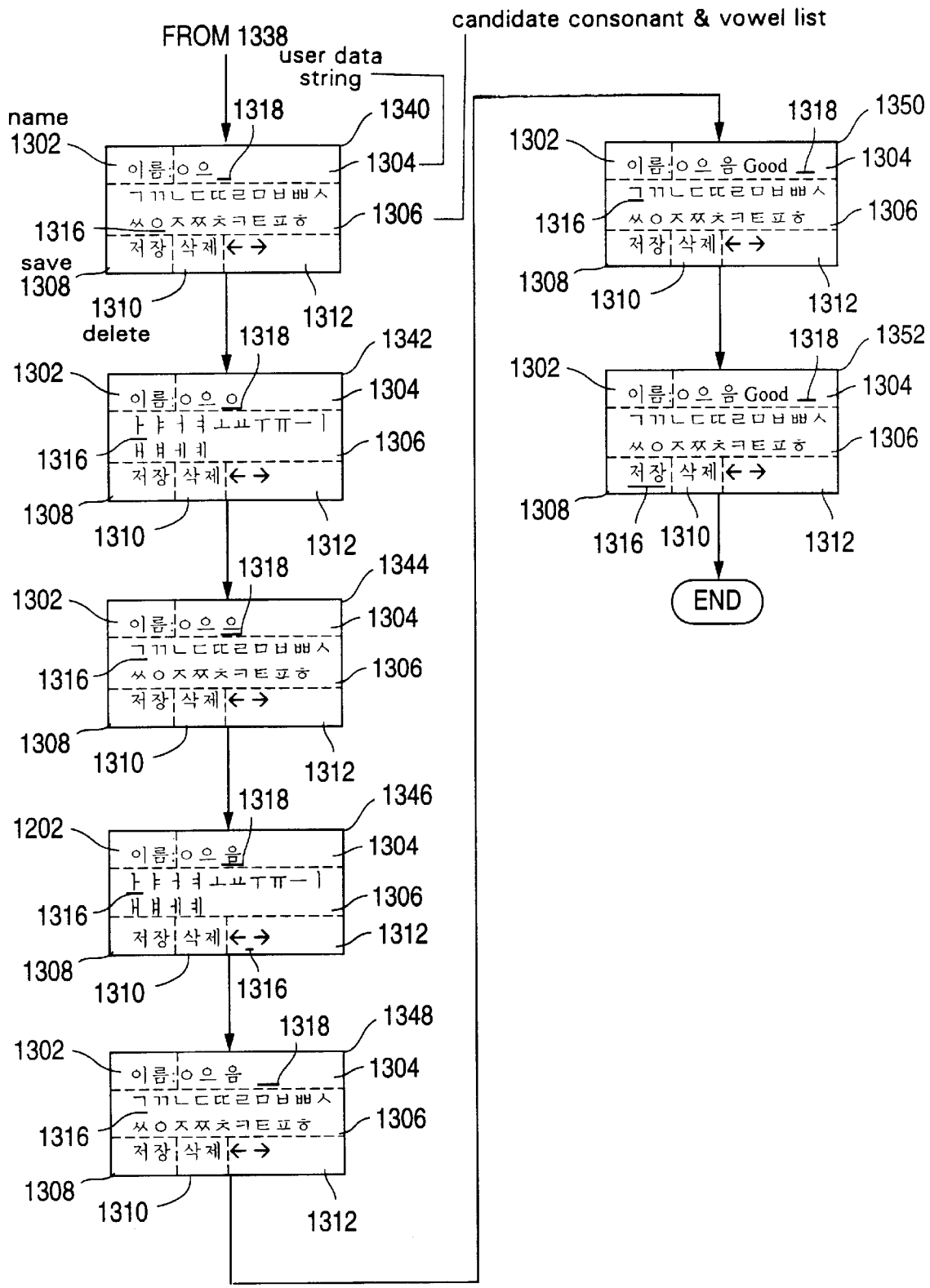

FIG. 13 shows a sequence of screen shots sequentially displayed on the display screen 702 to illustrate a process of entering a data string containing unusual Hangul consonant combinations that are invalid to a conventional cellular telephone but valid to the cellular telephone 700, in accordance with the present invention. In describing FIG. 13, it is assumed that the cellular telephone 700 is set in an appending mode, enabling the processor 804 to execute the application stored in the application memory 820, thereby allowing a user to input a first component into the cellular telephone 700.

Screen Shot 1320

The screen shot 1320 contains six display regions 1302, 1304, 1306, 1308, 1310, and 1312. The structures and functions of the regions 1302, 1304, 1306, 1308, 1310, and 1312 are the same as those of regions 902, 904, 906, 908, 910, and 912 shown in FIG. 9. The screen shot 1320 further contains two cursors 1316 and 1318. The operations of the cursors 1316 and 1318 are the same as those of cursors 916 and 918 shown in FIG. 9.

Since the cellular telephone 700 is set in an appending mode, the region 1306 displays the candidate consonant list, and the cursor 1316 points to the first consonant in the candidate consonant list.

Screen Shot 1322

To select the twelfth consonant from the candidate consonant list, the user moves the cursor 1316 to the second full-size component of the second display line in the region 1306 and then presses in the jog dial wheel 708. In response, the processor 804 executes the application to select the twelfth consonant and display it in the region 1304. The processor 804 then executes the application to display the candidate vowel list in the region 1306.

Screen Shot 1324

In the screen shot 1324, the consonant selected in the screen shot 1322 is displayed in the region 1304. The candidate consonant list in the screen shot 1322 is automatically replaced by the candidate vowel list, and the cursor 1316 automatically points to the first vowel in the candidate vowel list.

Screen Shot 1326

To indicate that the selected consonant forms the first character, the user moves the cursor 1316 to the right arrow "→" icon in the region 1312 and then presses in the jog dial wheel 708. The right arrow "→" is an explicit delimiter for indicating the completion of a character. It should be noted that, to existing cellular telephones, one consonant is an invalid Hangul character input. However, the application of the present invention is able to recognize a single consonant as a valid Hangul character. Thus, the processor 804 executes the application to move the cursor 1318 one full-size space to the right in the region 1304. The processor 804 then executes the application to display the candidate consonant list in the region 1306.

Screen Shot 1328

In the screen shot 1328, the candidate vowel list in the screen shot 1326 is replaced by the candidate consonant list, and the cursor 1316 automatically points to the first consonant of the candidate consonant list. The cursor 1318 is moved to the second full-size space in the region 1304.

Screen Shot 1330

To select the twelfth consonant from the candidate consonant list, the user moves the cursor 1316 to the second full-size component of the second display line in the region 1306 and then presses in the jog dial wheel 708. In response, the processor 804 executes the application to select the twelfth consonant and display it in the region 1304. The processor 804 then executes the application to display the candidate vowel list in the region 1306.

Screen Shot 1332

In the screen shot 1332, the consonant selected in the screen shot 1330 is displayed in the region 1304. The candidate consonant list in the screen shot 1330 is automatically replaced by the candidate vowel list, and the cursor 1316 automatically points to the first vowel in the candidate vowel list.

Screen Shot 1334

To select the ninth vowel from the candidate vowel list, the user moves the cursor 1316 to the ninth full-size component of the first display line in the region 1306 and then presses in the jog dial wheel 708. In response, the processor 804 executes the application to select the ninth vowel and display the vowel selected in the screen shot 1334, together with the consonant selected in the screen shot 1330, in the region 1304. The processor 804 then executes the application to display the candidate consonant list in the region 1306.

Screen Shot 1336

In the screen shot 1336, a character constructed from the two components selected in the screen shots 1330 and 1334 is displayed in the region 1304. The candidate vowel list in the screen shot 1334 is automatically replaced by the candidate consonant list, and the cursor 1316 automatically points to the first consonant in the candidate consonant list.

Screen Shot 1338

To indicate the completion of entering the second character, the user moves the cursor 1316 to the right arrow "→" icon in the region 1312 and then presses in the jog dial wheel 708. The right arrow "→" icon is an explicit delimiter to indicate the completion of the second character. In response, the processor 804 executes the application to move the cursor 1318 one full-size space to the right in the region 1304.

Screen Shot 1340

In the screen shot 1340, the cursor 1318 is moved to the third full-size space in the region 1304. To select the twelfth consonant from the candidate consonant list, the user moves the cursor 1316 to the second full-size component of the second display line in the region 1306 and then presses in the jog dial wheel 708. In response, the processor 804 executes the application to select the twelfth consonant and display it in the region 1304. The processor 804 then executes the application to display the candidate vowel list in the region 1306.

Screen Shot 1342

In the screen shot 1342, the consonant selected in the screen shot 1340 is displayed in the region 1304. The candidate consonant list in the screen shot 1340 is automatically replaced by the candidate vowel list, and the cursor 1316 automatically points to the first vowel in the candidate vowel list. To select the ninth vowel from the candidate vowel list, the user moves the cursor 1316 to the ninth full-size component of the first display line in the region 1306 and then presses in the jog dial wheel 708. In response, the processor 804 executes the application to select the ninth vowel from the candidate vowel list and display the vowel selected in the screen shot 1342, together with the consonant selected in the screen shot 1340, in the region 1304. The processor 804 then executes the application to display the candidate consonant list in the region 1306.

Screen Shot 1344

In the screen shot 1344, a character constructed from the two components selected in the screen shots 1340 and 1342 is displayed in the region 1304. The candidate vowel list in the screen shot 1342 is automatically replaced by the candidate consonant list, and the cursor 1316 automatically points to the first consonant in the candidate consonant list. To select the seventh consonant from the candidate consonant list, the user moves the cursor 1316 to the seventh full-size component of the first display line in the region 1306 and then presses in the jog dial wheel 708. In response, the processor 804 executes the application to select the seventh consonant from the candidate consonant list and display the consonant selected in the screen shot 1344, together with the two components selected in the screen shots 1340 and 1342, in the region 1304. The processor 804 also executes the application to replace the candidate consonant list in the screen shot 1344 with the candidate vowel list.

Screen Shot 1346

In the screen shot 1346, a character constructed from the three components selected in the screen shots 1340, 1342, and 1344 is displayed in the region 1304. To append a half-size space, the user moves the cursor 1316 to the "space" character in the region 1312 and then presses-in the jog dial wheel 708. In response, the processor 804 executes the application to insert a half-size space at the end of the data string in the region 1304. The processor 804 also executes the application to replace the candidate vowel list in the screen shot 1346 with the candidate consonant list.

Screen Shot 1348

As shown in the screen shot 1348, a half-size space is appended at the end of the data string in the region 1304.

Screen Shot 1350

As shown in the screen shot 1346, from the key panel 710, the user sequentially selects "G", "o", "o", and "d". The application is able to recognize that each of the selections from the key panel 710 is an ASCII character input. Thus, the processor 804 sequentially selects the ASCII characters "G", "o", "o", and "d" in response to each of the user's selections, and display each of the selected ASCII characters in half-size in the region 1304.

Screen Shot 1352

To save the data string formed in the region 1304, the user moves the cursor 1316 to the region 1308 and presses-in the jog dial wheel 708. In response, the processor 804 executes the application to store the data string into the data memory 815.

It should be noted that using the principle shown in FIG. 13, the cellular telephone 700 can enter one consonant, one vowel, two consonants, or two vowels as a Hangul character. Specifically, by entering a delimiter after one consonant, one vowel, two consonants, or two vowels that are inputted by a user, the application stored in the application memory 820 recognizes the one consonant, one vowel, two consonants, or two vowels that are inputted is a Hangul character. In response to the entering of the delimiter, the processor 804 executes the application to display the Hangul character in the region 1304.

In the preferred embodiment of the present invention, the candidate consonant list, the candidate vowel list, and the ASCII characters may be stored in the component storage 813. The application for performing the steps shown in FIGS. 9–13 may be stored in the application memory 820. The processor 804 executes the application to perform the steps illustrated in the screen shots shown in FIGS. 9–13.

Although the present invention has been shown and described with respect to preferred embodiments, various changes and modifications are deemed to lie within the spirit and scope of the invention as claimed.

What is claimed is:

1. A method for selecting Hangul components to form Hangul characters, the Hangul components including a plurality of first type basic components and a plurality of first type compound components, each of the first type compound components being composed of two first type basic components, the Hangul components further including a plurality of second type basic components and a plurality of second type compound components, each of the second type compound components being composed of two second type basic components, the method comprising the steps of:

(a) forming a first list including all the first type basic components;

(b) forming a second list including all the second type basic components;

(c) displaying the first list on a first screen region (1006) located on a screen, and inputting a first Hangul component by selecting a first type basic component from the first list;

(d) if the first Hangul component is a first type compound component, displaying the first list in the first screen region (1006), selecting a first type basic component from the first list, and forming the first Hangul component by combining the first type basic component selected in the step (c) with the first type basic component selected in the step (d); and (e) displaying the second list on the first screen region to replace the first list, and inputting a second Hangul component by selecting a second type basic component.

2. The method of claim 1, further comprising the step of:
forming a Hangul character by combining the first and second Hangul components.

3. The method of claim 2, further comprising the step of:
storing the formed Hangul character into a memory device.

4. The method of claim 2, further comprising the step of:
displaying the formed Hangul character in a second screen region (1004) located on the screen.

5. The method of claim 4, further comprising the step of:
displaying the first list on the first screen region to replace the second list, so that another Hangul character can be formed.

6. The method of claim 1, wherein the screen is located on an electronic device.

7. The method of claim 6, wherein the electronic device is a cellular telephone.

8. The method of claim 1, wherein the first type basic components are Hangul basic consonants, the first type compound components are Hangul compound consonants, the second type basic components are Hangul basic vowels, and second type compound components are Hangul compound vowels.

9. The method of claim 1, further comprising the steps of:

(f) if the second Hangul component is a second type compound component, displaying the second list in the first screen region (1006), selecting a second type basic component from the second list, and forming the second Hangul component by combining the second type basic component selected in the step (e) with the second type basic component selected in the step (f).

10. The method of claim 9, further comprising the step of:
forming a Hangul character by combining the first and second Hangul components.

11. The method of claim 10, further comprising the step of:
storing the formed Hangul character into a memory device.

12. The method of claim 10, further comprising the step of:
displaying the formed Hangul character in a second screen region (1004) located on the screen.

13. The method of claim 10, further comprising the step of:
displaying the consonant list on the first screen region to replace the vowel list, so that another Hangul character can be formed.

14. The method of claim 10, wherein the screen is located on an electronic device.

15. The method of claim 14, wherein the electronic device is a cellular telephone.

16. The method of claim 10, wherein the first type basic components are Hangul basic consonants, the first type compound components are Hangul compound consonants, the second type basic components are Hangul basic vowels, and second type compound components are Hangul compound vowels.

17. The method of claim 10, further comprising the steps of:

(g) displaying the first list on the first display region (1006) located on the screen, and inputting a third component by selecting a first type basic component from the first list; and (h) if the third Hangul component is a first type compound component, displaying the first list in the first screen region (1006), selecting a first type basic component from the first list, and forming the third Hangul component by combining the first type basic component selected in the step (g) with the first type basic component selected in the step (h).

18. The method of claim 17, further comprising the step of:
forming a Hangul character by combining the first, second, third Hangul components.

19. The method of claim 18, further comprising the step of:
storing the formed Hangul character into a memory device.

20. The method of claim 19, further comprising the step of:
displaying the formed Hangul character in a second screen region (1004) located on the screen.

21. The method of claim 19, further comprising the step of:
displaying the consonant list on the first screen region to replace the vowel list, so that another Hangul character can be formed.

22. The method of claim 19, wherein the screen is located on an electronic device.

23. The method of claim 22, wherein the electronic device is a cellular telephone.

24. The method of claim 19, wherein the first type basic components are Hangul basic consonants, the first type compound components are Hangul compound consonants, the second type basic components are Hangul basic vowels, and second type compound components are Hangul compound vowels.

25. A method for forming a Hangul character by selecting Hangul components from a consonant group and a vowel group, the consonant group containing a plurality of basic consonants and a plurality of compound consonants, each of the compound consonants being composed of two of the basic consonants, the vowel group containing a plurality of basic vowels and a plurality of compound vowels, each of the compound vowels being composed of two of the basic vowels, the method comprising the steps of:

(a) forming a consonant list containing all the basic vowels and some of the compound consonants;

(b) forming a vowel list containing all the basic vowels and some of the compound vowels;

(c) displaying the consonant list on a first screen region (1006) located on a screen;

(d) selecting a consonant from the consonant list displayed on the first screen region;

(e) in response to the selection of the consonant, displaying the vowel list on the first screen region to replace the consonant list;

(f) selecting a vowel from the vowel list displayed on the first screen region; and (g) forming a Hangul character by combining the selected consonant and vowel.

26. The method of claim 25, further comprising the step of:

(h) in response to the selection of the vowel, displaying the consonant list on the first screen region to replace the vowel list, so that another Hangul character can be formed.

27. The method of claim 25, further comprising the step of:

displaying the formed Hangul character in a second screen region (1004) located on the screen.

28. The method of claim 25, wherein the screen is located on an electronic device.

29. The method of claim 28, wherein the electronic device is a cellular telephone.

30. A method for forming a Hangul character by selecting Hangul components from a consonant group and a vowel group, the consonant group containing a plurality of basic consonants and a plurality of compound consonants, each of the compound consonants being composed of two of the basic consonants, the vowel group containing a plurality of basic vowels and a plurality of compound vowels, each of the compound vowels being composed of two of the basic vowels, the method comprising the steps of:

(a) forming a consonant list containing all the basic consonants and some of the compound consonants;

(b) forming a vowel list containing all the basic vowels and some of the compound vowels;

(c) displaying the consonant list on a first screen region (1006) located on a screen;

(d) selecting a first consonant from the consonant list displayed on the first screen region;

(e) in response to the selection of the first consonant, displaying the vowel list on the first screen region to replace the consonant list;

(g) selecting a vowel from the vowel list displayed on the first screen region;

(h) in response to the selection of the vowel, displaying the consonant list on the first screen region to replace the vowel list;

(i) selecting a second consonant from the consonant list displayed on the first screen region; and (j) forming a Hangul character by combining the selected consonants and vowel.

31. The method of claim 30, further comprising the step of:

(k) in response to the selection of the second consonant, displaying the vowel list on the first screen region to replace the consonant list, so that another Hangul character can be formed.

32. The method of claim 30, further comprising the step of:

displaying the formed Hangul character in a second screen region (1004) located on the screen.

33. The method of claim 30, wherein the screen is located on an electronic device.

34. The method of claim 33, wherein the electronic device is a cellular telephone.

35. An apparatus for selecting Hangul components to form Hangul characters, the Hangul components including a plurality of first type basic components and a plurality of first type compound components, each of the first type compound components being composed of two first type basic components, the Hangul components further including a plurality of second type basic components and a plurality of second type compound components, each of the second type compound components being composed of two second type basic components, the apparatus comprising:

(a) means for forming a first list including all the first type basic components;

(b) means for forming a second list including all the second type basic components;

(c) means for displaying the first list on a first screen region (1006) located on a screen, and inputting a first Hangul component by selecting a first type basic component from the first list;

(d) means, if the first Hangul component is a first type compound component, for displaying the first list in the first screen region (1006), selecting a first type basic component from the first list, and forming the first Hangul component by combining the first type basic component selected by the means (c) with the first type basic component selected by the means (d); and (e) means for displaying the second list on the first region to replace the first list, and inputting a second Hangul component by selecting a second type basic component.

36. The apparatus of claim 35, further comprising:

means for forming a Hangul character by combining the first and second Hangul components.

37. The apparatus of claim 36, further comprising:

means for storing the formed Hangul character into a memory device.

38. The apparatus of claim 36, further comprising:

means for displaying the formed Hangul character in a second screen region (1004) located on the screen.

39. The apparatus of claim 38, further comprising:

means for displaying the first list on the first screen region to replace the second list, so that another Hangul character can be formed.

40. The apparatus of claim 35, wherein the screen is located on an electronic device.

41. The apparatus of claim 40, wherein the electronic device is a cellular telephone.

42. The apparatus of claim 35, wherein the first type basic components are Hangul basic consonants, the first type compound components are Hangul compound consonants, the second type basic components are Hangul basic vowels, and second type compound components are Hangul compound vowels.

43. The apparatus of claim 35, further comprising:

(f) means, if the second Hangul component is a second type compound component, for displaying the second list in the first screen region (1006), selecting a second type basic component from the second list, and forming the second Hangul component by combining the second type basic component selected by the means (e) with the second type basic component selected by the means (f).

44. The apparatus of claim 43, further comprising:

means for forming a Hangul character by combining the first and second Hangul components.

45. The apparatus of claim 44, further comprising:
means for storing the formed Hangul character into a memory device.

46. The apparatus of claim 44, further comprising:
means for displaying the formed Hangul character in a second screen region (1004) located on the screen.

47. The apparatus of claim 44, further comprising:
means for displaying the consonant list on the first screen region to replace the vowel list, so that another Hangul character can be formed.

48. The apparatus of claim 44, wherein the screen is located on an electronic device.

49. The apparatus of claim 48, wherein the electronic device is a cellular telephone.

50. The apparatus of claim 44, wherein the first type basic components are Hangul basic consonants, the first type compound components are Hangul compound consonants, the second type basic components are Hangul basic vowels, and second type compound components are Hangul compound vowels.

51. The apparatus of claim 44, further comprising:
(f) means for displaying the first list on the first screen region (1006) located on the screen, and inputting a third component by selecting a first type basic component from the first list; and
(g) means, if the third Hangul component is a first type compound component, for displaying the first list in the first screen region (1006), selecting a first type basic component from the first list, and forming the third Hangul component by combining the first type basic component selected by the means (f) with the first type basic component selected by the means (g).

52. The apparatus of claim 51, further comprising:
means for forming a Hangul character by combining the first, second, and third Hangul components.

53. The apparatus of claim 52, further comprising:
means for storing the formed Hangul character into a memory device.

54. The apparatus of claim 53, further comprising:
means for displaying the formed Hangul character in a second screen region (1004) located on the screen.

55. The apparatus of claim 53, further comprising:
means for displaying the consonant list on the first screen region to replace the vowel list, so that another Hangul character can be formed.

56. The apparatus of claim 53, wherein the screen is located on an electronic device.

57. The apparatus of claim 56, wherein the electronic device is a cellular telephone.

58. The apparatus of claim 53, wherein the first type basic components are Hangul basic consonants, the first type compound components are Hangul compound consonants, the second type basic components are Hangul basic vowels, and second type compound components are Hangul compound vowels.

59. An apparatus for forming a Hangul character by selecting Hangul components from a consonant group and a vowel group, the consonant group containing a plurality of basic consonants and a plurality of compound consonants, each of the compound consonants being composed of two of the basic consonants, the vowel group containing a plurality of basic vowels and a plurality of compound vowels, each of the compound vowels being composed of two of the basic vowels, the apparatus comprising:
(a) means for forming a consonant list containing all of the basic vowels and some of the compound consonants;
(b) means for forming a vowel list containing all of the basic vowels and some of the compound vowels;
(c) means for displaying the consonant list on a first screen region (1006) located on a screen;
(d) means for selecting a consonant from the consonant list displayed on the first screen region;
(e) means for displaying the vowel list on the first screen region to replace the consonant list;
(f) means for selecting a vowel from the vowel list displayed on the first screen region; and
(g) means for forming a Hangul character by combining the selected consonant and vowel.

60. The apparatus of claim 59, further comprising:
(h) means for displaying the consonant list on the first screen region to replace the vowel list, so that another Hangul character can be formed.

61. The apparatus of claim 59, further comprising:
means for displaying the formed Hangul character in a second screen region (1004) located on the screen.

62. The apparatus of claim 59, wherein the screen is located on an electronic device.

63. The apparatus of claim 62, wherein the electronic device is a cellular telephone.

64. An apparatus for forming a Hangul character by selecting Hangul components from a consonant group and a vowel group, the consonant group containing a plurality of basic consonants and a plurality of compound consonants, each of the compound consonants being composed of two of the basic consonants, the vowel group containing a plurality of basic vowels and a plurality of compound vowels, each of the compound vowels being composed of two of the basic vowels, the apparatus comprising:
(a) means for forming a consonant list containing all the basic consonants and some of the compound consonants;
(b) means for forming a vowel list containing all the basic vowels and some of the compound vowels;
(c) means for displaying the consonant list on a first screen region (1006) located on a screen;
(d) means for selecting a consonant from the consonant list displayed on the first screen region;
(e) means for displaying the vowel list on the first screen region to replace the consonant list;
(g) means for selecting a vowel from the vowel list displayed on the first screen region;
(h) means for displaying the consonant list on the first screen region to replace the vowel list;
(i) means for selecting a consonant from the consonant list displayed on the first screen region; and
(j) means for forming a Hangul character by combining the selected consonants and vowel.

65. The apparatus of claim 64, further comprising:
(k) means for displaying the vowel list on the first screen region to replace the consonant list, so that another Hangul character can be formed.

66. The apparatus of claim 64, further comprising:
means for displaying the formed Hangul character in a second screen region (1004) located on the screen.

67. The apparatus of claim 64, wherein the screen is located on an electronic device.

68. The apparatus of claim 67, wherein the electronic device is a cellular telephone.

* * * * *